US010700519B2

(12) United States Patent
Ikenaga

(10) Patent No.: US 10,700,519 B2
(45) Date of Patent: Jun. 30, 2020

(54) POWER SUPPLY CIRCUIT, AND METHOD FOR CONTROLLING THE SAME

(71) Applicant: Renesas Electronics Corporation, Tokyo (JP)

(72) Inventor: Yoshifumi Ikenaga, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 15/987,715

(22) Filed: May 23, 2018

(65) Prior Publication Data
US 2018/0269680 A1 Sep. 20, 2018

Related U.S. Application Data

(63) Continuation of application No. 14/685,517, filed on Apr. 13, 2015, now Pat. No. 9,997,910.

(30) Foreign Application Priority Data

Apr. 28, 2014 (JP) ................. 2014-092412

(51) Int. Cl.
H02J 1/10 (2006.01)
H02J 50/40 (2016.01)
(Continued)

(52) U.S. Cl.
CPC ............ H02J 1/10 (2013.01); H02J 7/025 (2013.01); H02J 50/00 (2016.02); H02J 50/40 (2016.02)

(58) Field of Classification Search
CPC .. H02J 1/10; H02J 7/0024; H02J 7/025; H02J 17/00; H02J 50/00; H02J 50/40; Y10T 307/653
(Continued)

(56) References Cited

U.S. PATENT DOCUMENTS 5,814,972 A 9/1998 Shimada et al.
7,893,561 B2 2/2011 Weidenheimer
(Continued)

FOREIGN PATENT DOCUMENTS

JP 2959657 B2 10/1999
JP 2006-020491 A 1/2006
JP 2011-211885 A 10/2011

OTHER PUBLICATIONS

Japanese Office Action dated Jul. 25, 2017 with an English translation thereof in Japanese Application No. 2014-092412.
(Continued)

Primary Examiner — Hal Kaplan
(74) Attorney, Agent, or Firm — McGinn IP Law Group, PLLC

(57) ABSTRACT

A power supply system includes a plurality of voltage sources, a switch circuit that switches between a state in which the plurality of voltage sources are connected in series and a state in which the plurality of voltage sources are connected in parallel, and a voltage control circuit that boosts an input voltage. The switch circuit connects the plurality of voltage sources in series, supplies an output of the plurality of serially connected voltage sources to an output node of the voltage control circuit, thereafter connects the plurality of voltage sources in parallel, and supplies outputs of the plurality of parallel-connected voltage sources to the voltage control circuit, and the voltage control circuit boosts voltages of the plurality of parallel-connected voltage sources.

12 Claims, 19 Drawing Sheets

(51) Int. Cl.
*H02J 50/00* (2016.01)
*H02J 7/02* (2016.01)

(58) Field of Classification Search
USPC .......................................................... 307/71
See application file for complete search history.

(56) References Cited

U.S. PATENT DOCUMENTS

| | | |
|---|---|---|
| 8,704,493 B2 | 4/2014 | Uehashi |
| 9,389,632 B2 | 7/2016 | Km |
| 9,671,810 B2 | 6/2017 | Km |
| 2002/0113493 A1 | 8/2002 | Morrow |
| 2005/0265052 A1 | 12/2005 | Utsunomiya |
| 2011/0221383 A1 | 9/2011 | Uehashi et al. |
| 2013/0293006 A1 | 11/2013 | Kang |

OTHER PUBLICATIONS

Non-Final Office Action dated Jun. 2, 2017 in co-pending U.S. Appl. No. 14/685,517.
Final Office Action dated Nov. 24, 2017 in co-pending U.S. Appl. No. 14/685,517.
Notice of Allowance dated Feb. 8, 2018 in co-pending U.S. Appl. No. 14/685,517.

POWER SUPPLY CIRCUIT, AND METHOD FOR CONTROLLING THE SAME

CROSS-REFERENCE TO RELATED APPLICATIONS

This application is a Continuation Application of U.S. patent application Ser. No. 14/685,517, filed on Apr. 13, 2015, which is based upon and claims the benefit of priority from Japanese patent application No. 2014-092412, filed on Apr. 28, 2014, the disclosure of which is incorporated herein in its entirety by reference.

BACKGROUND

The present invention relates to a power supply circuit and a method for controlling the power supply circuit. The present invention relates to, for example, a power supply circuit provided with a plurality of voltage sources, and a method for controlling the power supply circuit.

Energy harvesting technology for converting surrounding energy such as optical energy, vibrational energy, thermal energy, and radio waves (electromagnetic waves) into power has received attention in recent years. Use of the energy harvesting technology eliminates the need to install batteries in electronics, thereby improving the convenience of the electronics.

Japanese Patent No. 2959657 discloses electronic-related technology that is capable of enhancing the degree of freedom of usage of a plurality of batteries to improve the use efficiency of the batteries. Japanese Unexamined Patent Application Publication No. 2006-20491 discloses a technique concerning an electronic having a power supply wherein a voltage of power to be supplied is low, a booster circuit that boosts the power to a voltage with which a load circuit can be operated, and the load circuit operated by the power boosted by the booster circuit.

When the energy harvesting technology is used, the voltages obtained in respective voltage sources are extremely low. It is therefore necessary to provide a voltage control circuit in order to increase the voltage of each voltage source to the level where the electronics can be driven.

SUMMARY

However, because the voltage output from each voltage source is extremely small, it takes time for the voltage control circuit to be activated after the voltage is supplied from each voltage source to the voltage control circuit. This brings about a problem that it takes time to activate a power supply circuit.

Other objects and new features will become obvious from the description of the present specification and the accompanying drawings.

According to one embodiment, a power supply circuit has a plurality of voltage sources, a switch circuit that switches between a state in which the plurality of voltage sources are connected in series and a state in which the plurality of voltage sources are connected in parallel, and a voltage control circuit. The switch circuit connects the plurality of voltage sources in series, supplies an output of the plurality of serially connected voltage sources to an output node of the voltage control circuit, thereafter connects the plurality of voltage sources in parallel, and supplies outputs of the plurality of parallel-connected voltage sources to the voltage control circuit.

According to the foregoing embodiment, a power supply circuit that can be activated at high speeds and a method for controlling the power supply circuit can be provided.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Embodiment 1

Embodiment 1 is described hereinafter with reference to the drawings.

Figure 1:
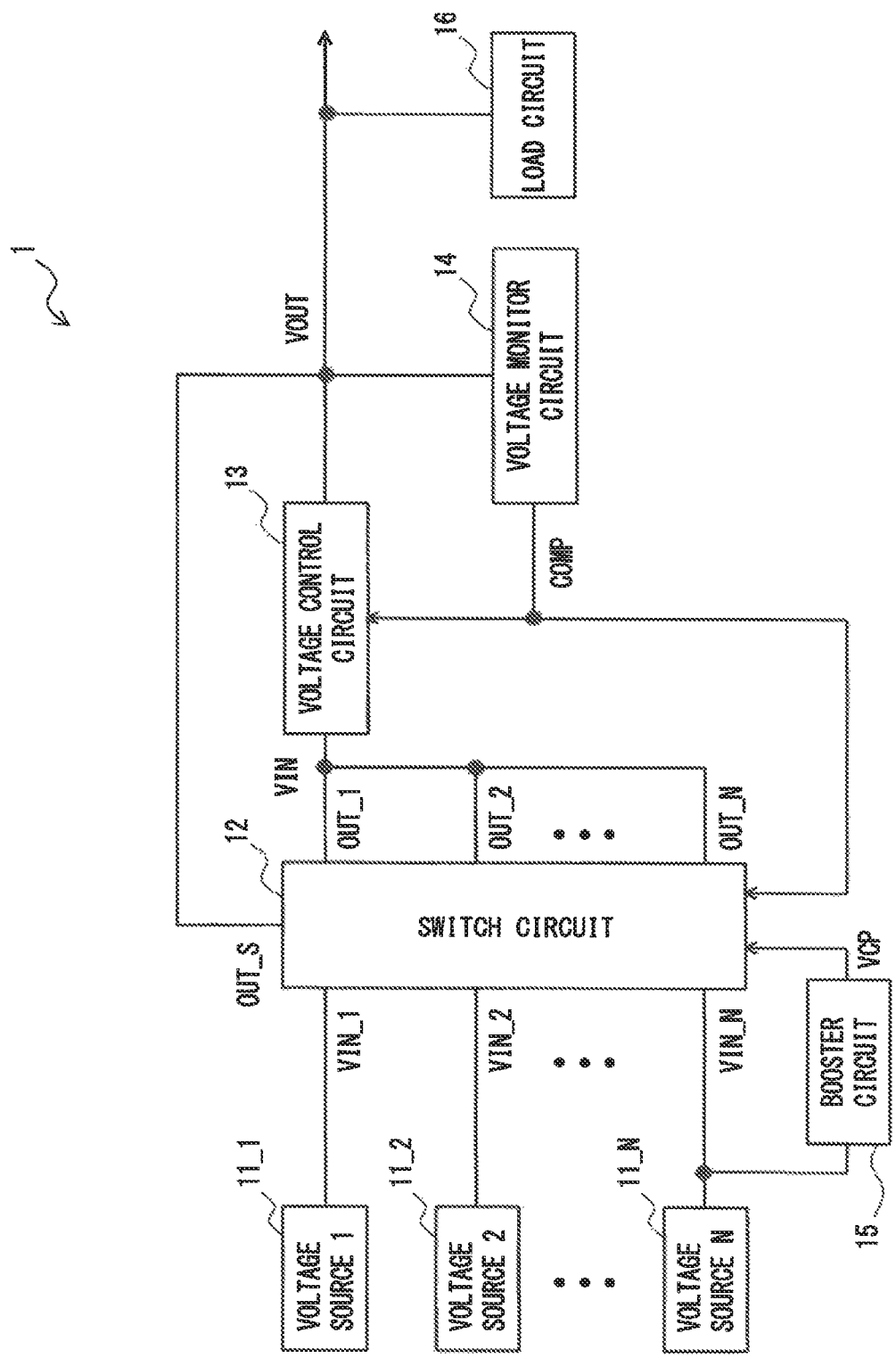
FIG. 1 is a block diagram showing a power supply circuit according to Embodiment 1.

FIG. 1 is a block diagram showing a power supply circuit according to Embodiment 1. As shown in FIG. 1, a power supply circuit 1 according to the present embodiment has voltage sources 11_1 to 11_N (N is an integer of two or more), a switch circuit 12, a voltage control circuit 13, a voltage monitor circuit 14, and a booster circuit 15. The power supply circuit 1 supplies power to a load circuit 16.

Voltages VIN_1 to VIN_N, output from the respective voltage sources 11_1 to 11_N, are supplied to the switch circuit 12. The voltage VIN_N that is output from the voltage source 11_N is supplied to the booster circuit 15. Note that, in the power supply circuit 1 shown in FIG. 1, the voltage VIN_N that is output from the single voltage source 11_N is supplied to the booster circuit 15; however, the present embodiment may have a configuration in which voltages that are output from a plurality of voltage sources (however, the number of voltage sources is less than N) are supplied to the booster circuit 15. In other words, a voltage that is output from at least one of the plurality of voltage sources 11_1 to 11_N may be supplied to the booster circuit 15.

The voltage sources 11_1 to 11_N each generate a voltage (power) using the energy harvesting technology. For instance, the voltage sources 11_1 to 11_N convert surrounding energy such as optical energy, vibrational energy, thermal energy, and radio waves (electromagnetic waves) into power. For example, a photoelectric conversion element (solar cell) can be used in order to convert optical energy into power. A piezoelectric element can be used in order to convert a vibrational energy into power. A thermoelectric element (Peltier element) can be used in order to convert a thermal energy into power. A circuit (rectenna) with an antenna and rectifier element, for example, can be used in order to converting radio waves into power. When the energy harvesting technology is used, a voltage obtained from a single voltage source is extremely small. For example, a voltage obtained to convert radio waves into power is approximately 0.1 V to 0.2 V.

When converting radio waves into power, in order to convert radio waves of a plurality of frequency bands into, power the voltage sources 11_1 to 11_N corresponding to respective frequency bands (i.e., the voltage sources 11_1 to 11_N provided with antennas for receiving radio waves of the respective frequency bands) may be provided. Here, a predetermined frequency band is a frequency band that uses a large number of radio waves (i.e., high-energy frequency bands), such as frequency bands of cellular phones, frequency bands of wireless LANs, and frequency bands for terrestrial digital broadcasting. When using radio waves of many different frequency bands, in some cases the voltages obtained at the voltage sources 11_1 to 11_N vary depending on the frequency bands.

The switch circuit 12 switches between a state in which the plurality of voltage sources 11_1 to 11_N are connected in series and a state in which the plurality of voltage sources 11_1 to 11_N are connected in parallel. Specifically, when the plurality of voltage sources 11_1 to 11_N are connected in series, the switch circuit 12 supplies an output OUT_S of the plurality of serially connected voltage sources 11_1 to 11_N to an output node VOUT of the voltage control circuit 13. When the plurality of voltage sources 11_1 to 11_N are connected in parallel, the switch circuit 12 supplies outputs OUT_1 to OUT_N of the plurality of parallel-connected voltage sources 11_1 to 11_N to an input node VIN of the voltage control circuit 13.

Figure 2:
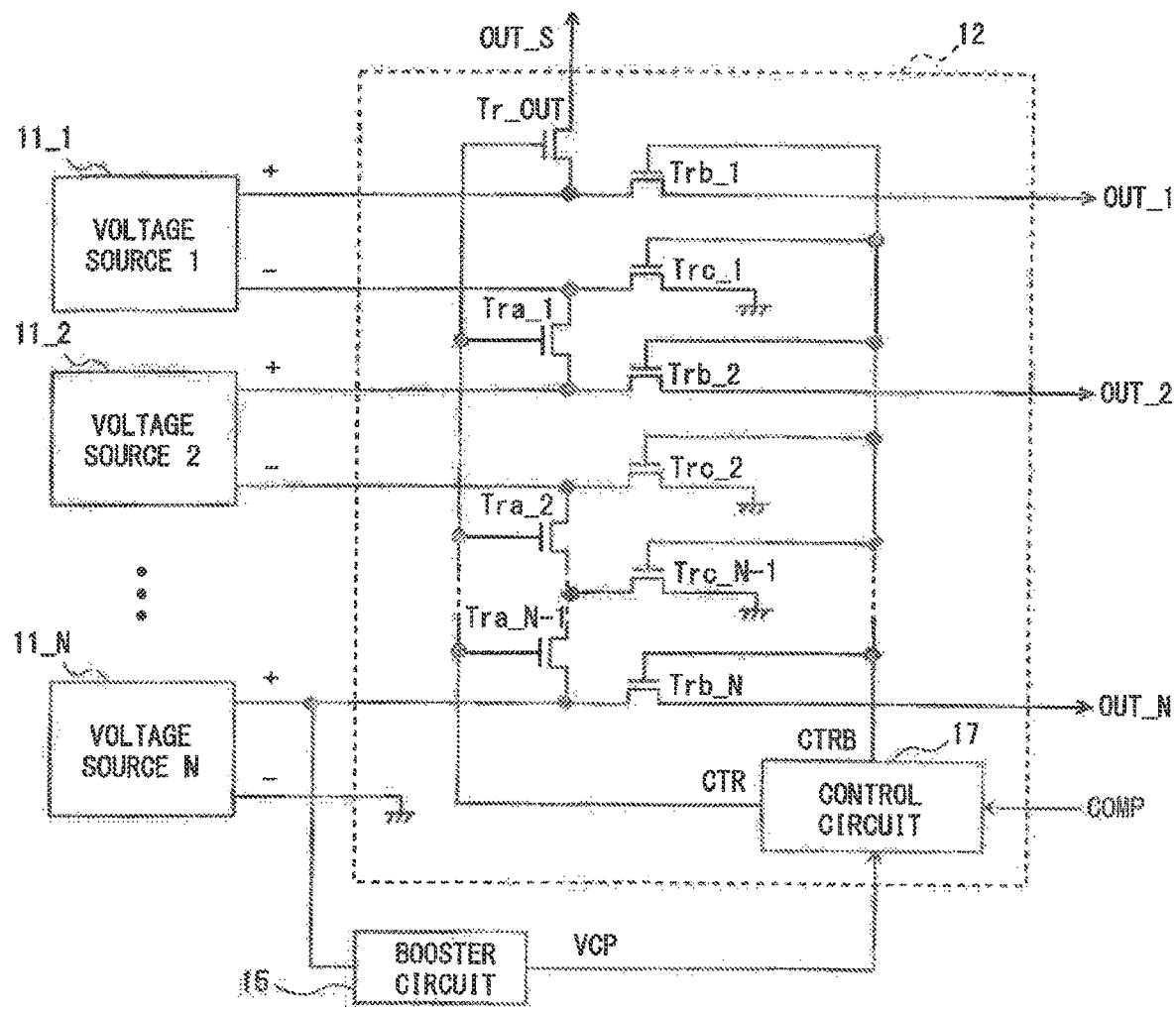
FIG. 2 is a circuit diagram showing an example of a switch circuit provided in the power supply circuit according to Embodiment 1.

FIG. 2 is a circuit diagram showing an example of the switch circuit 12 provided in the power supply circuit 1 according to the present embodiment. As shown in FIG. 2, the switch circuit 12 has transistors Tr_OUT, Tra_1 to Tra_N−1, Trb_1 to Trb_N, Trc_1 to Trc_N−1, and a control circuit 17. In the present embodiment, NMOS transistors, for example, can be used as the transistors Tr_OUT, Tra_1 to Tra_N−1, Trb_1 to Trb_N, and Trc_1 to Trc_N−1.

A transistor Tra_i (i is an integer of 1 to N−1) is provided between a negative terminal of the voltage source 11_i and a positive terminal of a voltage source 11_i+1. A control signal CTR, output from the control circuit 17, is supplied to gates of the transistors Tra_1 to Tra_N−1. When the control signal CTR is at a high level ("1"), the transistors Tra_1 to Tra_N−1 are ON, resulting in the state in which the plurality of voltage sources 11_1 to 11_N are connected in series.

The transistor Tr_OUT is provided between a positive terminal of the voltage source 11_1 and the output node VOUT of the voltage control circuit 13. When the control signal CTR is at a high level ("1"), the transistor Tr_OUT is ON, allowing the plurality of serially connected voltage sources 11_1 to 11_N to supply the output OUT_S thereof to the output node VOUT of the voltage control circuit 13.

A transistor Trb_i (i is an integer of 1 to N) is provided between a positive terminal of the voltage source 11_i and the input node VIN of the voltage control circuit 13. A transistor Trc_i (i is an integer of 1 to N−1) is provided between the negative terminal of the voltage source 11_i and a ground potential. A control signal CTRB, output from the control circuit 17, is supplied to gates of the transistors Trb_1 to Trb_N and gates of the transistors Trc_1 to Trc_N−1. The control signal CTRB is an inversion of the control signal CTR.

When the control signal CTR is at a low level ("0") and the control signal CTRB at a high level ("1"), the transistors Tra_1 to Tra_N−1 are OFF, and the transistors Trb_1 to Trb_N and Trc_1 to Trc_N−1 are ON, connecting the plurality of voltage sources 11_1 to 11_N in parallel. In other words, the positive terminal of the voltage source 11_i (i is an integer of 1 to N) is connected to the input node VIN of the voltage control circuit 13, while the negative terminal of the voltage source 11_i is connected to the ground potential.

The control circuit 17 inputs a monitor signal COMP that is output from the voltage monitor circuit 14, and outputs the control signals CTR, CTRB corresponding to the monitor signal COMP to each of the transistors. For instance, when the monitor signal COMP that is output from the voltage monitor circuit 14 is at a high level ("1"), the control circuit 17 outputs a low-level ("0") signal as the control signal CTR and a high-level ("1") signal as the control signal CTRB. Also, when the monitor signal COMP that is output from the voltage monitor circuit 14 is at a low level ("0"), the control circuit 17 outputs a high-level ("1") signal as the control signal CTR and a low-level ("0") signal as the control signal CTRB.

A voltage VCP that is boosted by the booster circuit 15 is supplied to the control circuit 17. In other words, the voltage VCP supplied from the booster circuit 15 is used to drive each of the transistors Tr_OUT, Tra_1 to Tra_N−1, Trb_1 to Trb_N, and Trc_1 to Trc_N−1.

Figure 3A:
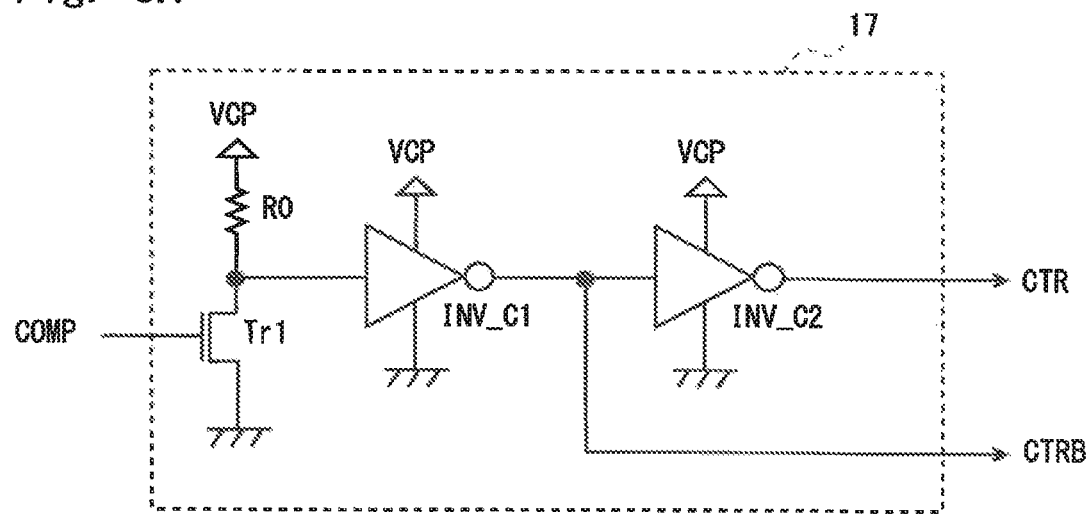
FIG. 3A is a circuit diagram showing an example of a control circuit provided in the switch circuit shown in FIG. 2.

FIG. 3A is a circuit diagram showing an example of the control circuit 17 provided in the switch circuit 12 shown in FIG. 2. As shown in FIG. 3A, the control circuit 17 can be configured using a NMOS transistor Tr1, a resistor R0, and inverters INV_C1, INV_C2. The voltage VCP is supplied to a drain of the NMOS transistor Tr1 via the resistor R0. A source of the NMOS transistor Tr1 is connected to a ground potential, and the monitor signal COMP is supplied to a gate of the same. The NMOS transistor Tr1 and the resistor R0 configure a level shifter circuit.

A node connecting the drain of the NMOS transistor Tr1 and the resistor R0 is connected to an input of the inverter INV_C1. An output of the inverter INV_C1 is connected to an input of the inverter INV_C2. The control signal CTR is output from an output of the inverter INV_C2. The control signal CTRB is output from the output of the inverter INV_C1. The voltage VCP that is boosted by the booster circuit 15 is supplied to the inverters INV_C1, INV_C2.

Supplying a high-level monitor signal COMP to a gate of the NMOS transistor Tr1 turns the NMOS transistor Tr1 ON, and consequently the level of the input of the inverter INV_C1 becomes low. Therefore, the inverter INV_C1 outputs a high-level signal as the control signal CTRB. Furthermore, a high-level signal is supplied to the input of the inverter INV_C2, allowing the inverter INV_C2 to output a low-level signal as the control signal CTR.

Supplying a low-level monitor signal COMP to the gate of the NMOS transistor Tr1 turns the NMOR transistor Tr1 OFF, and consequently the level of the input of the inverter INV_C1 becomes high. Therefore, the inverter INV_C1 outputs a low-level signal as the control signal CTRB. Furthermore, a low-level signal is supplied to the input of the inverter INV_C2, allowing the inverter INV_C2 to output a high-level signal as the control signal CTR.

Figure 3B:
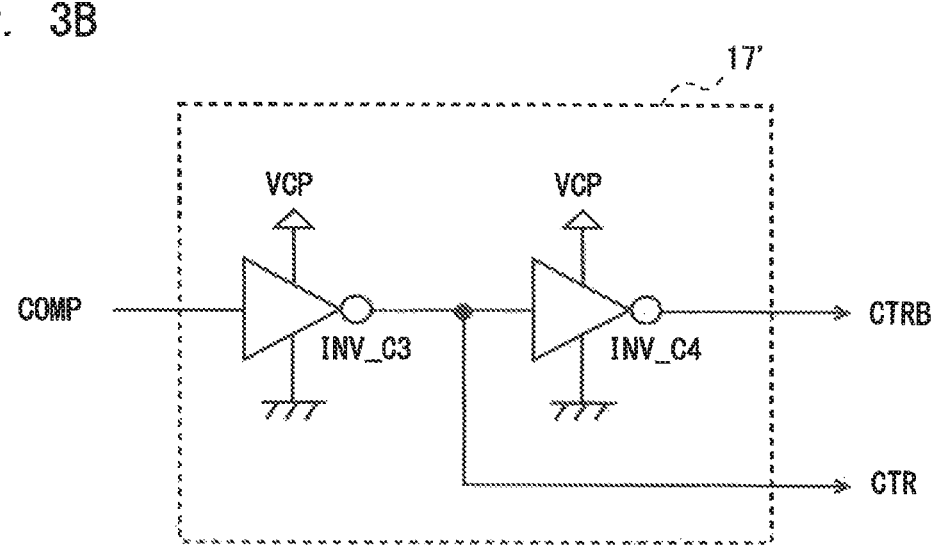
FIG. 3B is a circuit diagram showing another example of a control circuit provided in the switch circuit shown in FIG. 2.

In the present embodiment, when the level of a monitor signal COMP output from the voltage monitor circuit 14 is sufficiently high, the level shifter circuit (the NMOS transistor Tr1 and the resistor R0) may be omitted. In other words, a control circuit such as a control circuit 17' shown in FIG. 3B may be configured using two inverters INV_C3, INV_C4. In this case, the control signal CTR is output from an output of the inverter INV_C3, and the control signal CTRB is output from an output of the inverter INV_C4.

The voltage control circuit 13 shown in FIG. 1 boosts a voltage that is supplied to the input node VIN, and outputs the boosted voltage to the output node VOUT. In other words, the voltage control circuit 13 boosts the outputs OUT_1 to OUT_N of the plurality of parallel-connected voltage sources 11_1 to 11_N.

Figure 4:
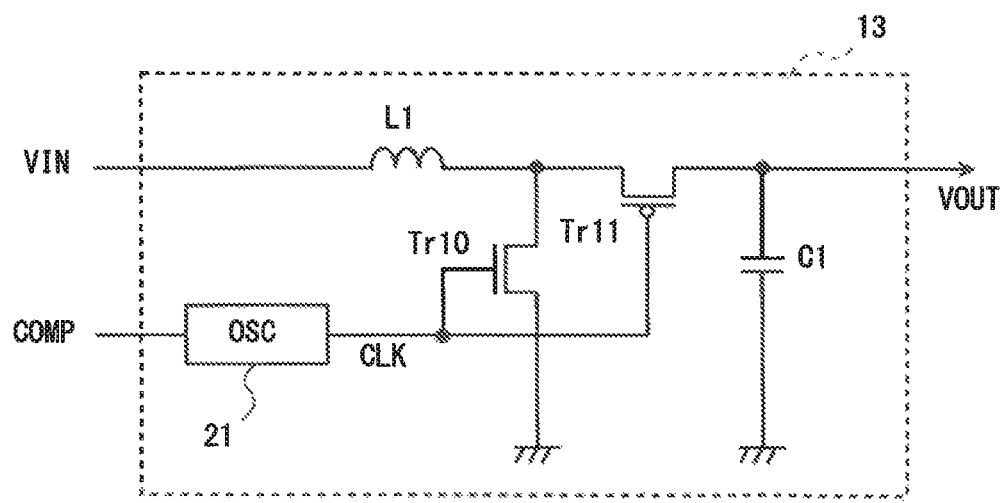
FIG. 4 is a circuit diagram showing an example of a voltage control circuit provided in the power supply circuit according to Embodiment 1.

FIG. 4 is a circuit diagram showing an example of the voltage control circuit 13. As shown in FIG. 4, the voltage control circuit 13 can be configured using a switching regulator having an inductor L1, a NMOS transistor Tr10, a PMOS transistor Tr11, a capacitor C1, and an oscillator circuit 21.

One end of the inductor L1 is connected to the input node VIN, and the outputs OUT_1 to OUT_N of the respective voltage sources 11_1 to 11_N are supplied to the end of the inductor L1. A drain of the NMOS transistor Tr10 is connected to the other end of the inductor L1 and a source of the PMOS transistor Tr11, while a source of the same is grounded, and a clock signal CLK is supplied to a gate of the same. A source of the PMOS transistor Tr11 is connected to the other end of the inductor L1 and the drain of the NMOS transistor Tr10, while a drain of the same is connected to one end of the capacitor C1, and the clock signal CLK is supplied to a gate of the same. An output voltage VOUT (a voltage that is output to the output node VOUT is also described as "output voltage VOUT") is output from the drain of the PMOS transistor Tr11.

When a monitor signal COMP that is output from the voltage monitor circuit 14 is at a high level, the oscillator circuit 21 generates a clock signal CLK and outputs this generated clock signal CLK to the gate of the NMOS transistor Tr10 and the gate of the PMOS transistor Tr11.

Figure 5:
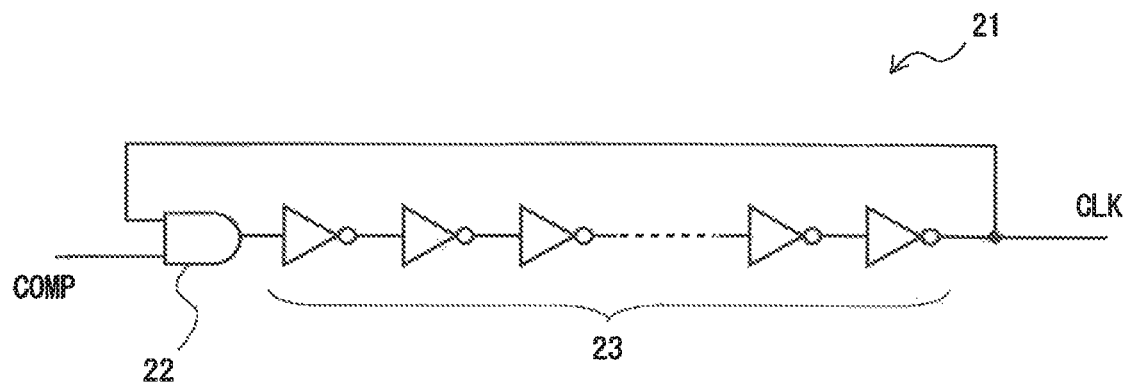
FIG. 5 is a circuit diagram showing an example of an oscillator circuit provided in the voltage control circuit shown in FIG. 4.

FIG. 5 is a circuit diagram showing an example of the oscillator circuit 21 provided in the voltage control circuit 13. As shown in FIG. 5, the oscillator circuit 21 has an AND circuit 22 and an odd number of inverters 23. The AND circuit 22 and the odd number of inverters 23 are connected in series. An output of the last stage of the odd number of inverters 23 is supplied to one of inputs of the AND circuit 22, and the monitor signal COMP that is output from the voltage monitor circuit 14 is supplied to the other input. When the monitor signal COMP is at a high level, the odd number of inverters 23 are connected in the form of a ring to configure a ring oscillator. Therefore, a clock signal CLK is output from the last stage of the odd number of inverters 23. At this point, the oscillator circuit 21 is driven by the output voltage VOUT supplied from the voltage control circuit 13 itself.

In the voltage control circuit 13 shown in FIG. 4, when the clock signal CLK that is supplied from the oscillator circuit 21 is at a high level, the NMOS transistor Tr10 is ON, and the PMOS transistor Tr11 is OFF. At this moment, the outputs OUT_1 to OUT_N of the respective voltage sources 11_1 to 11_N are supplied to one end of the inductor L1, and the other end is grounded, allowing a current to flow through the inductor L1. As a result, energy is accumulated in the inductor L1. Thereafter, when the clock signal CLK supplied from the oscillator circuit 21 is at a low level, the NMOS transistor Tr10 is OFF, and the PMOS transistor Tr11 is ON. As a result, the energy accumulated in the inductor L1 is released from the drain of the PMOS transistor Tr11, and the output voltage VOUT is output.

The voltage monitor circuit 14 shown in FIG. 1 monitors the voltage of the output node VOUT of the voltage control circuit 13. Specifically, when the voltage of the output node VOUT is equal to or greater than a predetermined voltage, the voltage monitor circuit 14 outputs a high-level signal as the monitor signal COMP. When, on the other hand, the voltage of the output node VOUT is lower than the predetermined voltage, the voltage monitor circuit 14 outputs a low-level signal as the monitor signal COMP.

Figure 6:
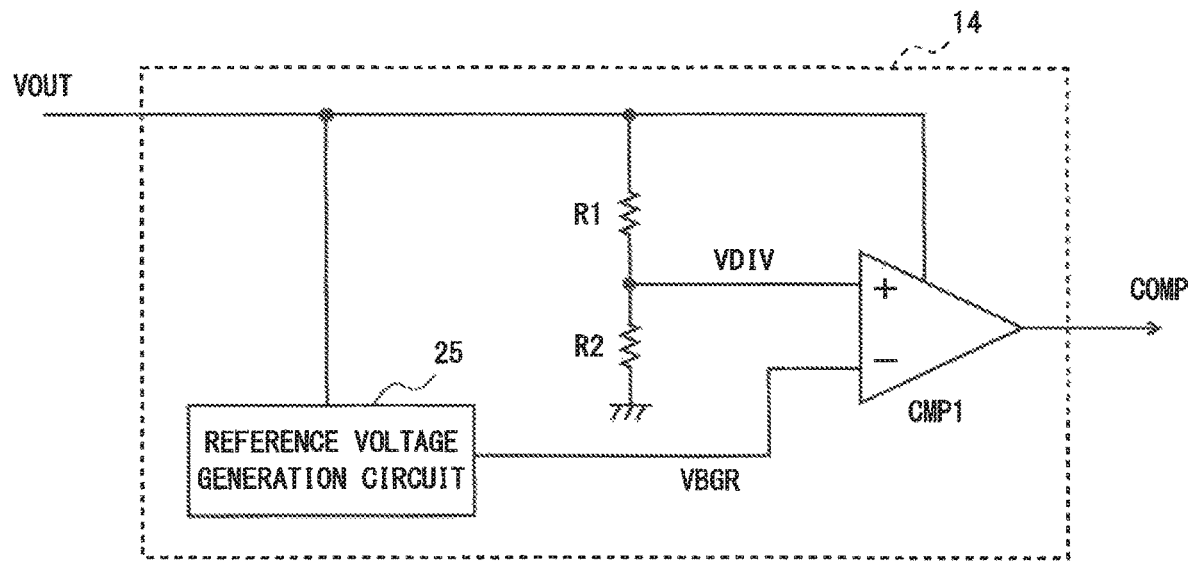
FIG. 6 is a circuit diagram showing an example of a voltage monitor circuit provided in the power supply circuit according to Embodiment 1.

FIG. 6 is a circuit diagram showing an example of the voltage monitor circuit 14. As shown in FIG. 6, the voltage monitor circuit 14 has resistors R1, R2, a comparator CMP1, and a reference voltage generation circuit 25. One end of the resistor R1 is connected to the output node VOUT, while the other end is connected to one end of the resistor R2. The other end of the resistor R2 is connected to a ground potential. In other words, the resistors R1 and R2 configure a resistor divider circuit, wherein a voltage VDIV obtained by dividing the voltage of the output node VOUT is output from a node to which the resistors R1 and R2 are connected. The voltage VDIV is supplied to a non-inverting input terminal (+) of the comparator CMP1.

Figure 7:
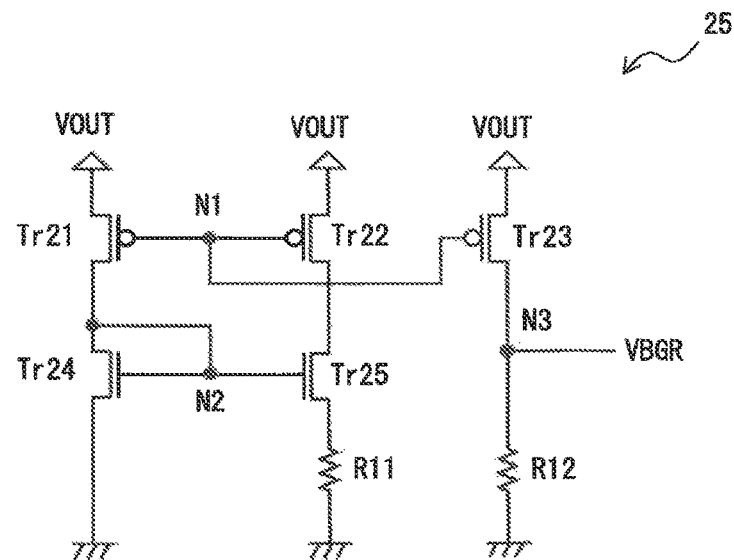
FIG. 7 is a circuit diagram showing an example of a reference voltage generation circuit provided in the voltage monitor circuit shown in FIG. 6.

The reference voltage generation circuit 25 generates a reference voltage VBGR and supplies the generated reference voltage VBGR to an inverting input terminal (−) of the comparator CMP1. FIG. 7 is a circuit diagram showing an example of the reference voltage generation circuit 25. As shown in FIG. 7, the reference voltage generation circuit 25 has PMOS transistors Tr21 to Tr23, NMOS transistors Tr24 and Tr25, and resistors R11, R12.

A source of the PMOS transistor Tr21 is connected to the output node VOUT, a gate to a node N1, and a drain to a node N2. A source of the PMOS transistor Tr22 is connected to the output node VOUT, a gate to the node N1, and a drain to a drain of the NMOS transistor Tr25. A source of the PMOS transistor Tr23 is connected to the output node VOUT, a gate to the node N1, and a drain to a node N3. Drain and gate of the NMOS transistor Tr24 are connected to the node N2, and a source to a ground potential. A drain of the NMOS transistor Tr25 is connected to the drain of the PMOS transistor Tr22, and a gate to the node N2, and a source to one end of the resistor R1. The other end of the resistor R1 is connected to the ground potential. One end of the resistor R2 is connected to the node N3, and the other end to the ground potential. The reference voltage VBGR is output from the node N3. The reference voltage generation circuit 25 outputs a constant reference voltage VBGR that does not depend on the voltage of the output node VOUT.

The comparator CMP1 provided in the voltage monitor circuit 14 shown in FIG. 6 compares the voltage VDIV with the reference voltage VBGR, and outputs the comparison result as the monitor signal COMP. Specifically, when the voltage VDIV is lower than the reference voltage VBGR, the comparator CMP1 outputs a low-level signal as the monitor signal COMP. However, when the voltage VDIV is equal to or greater than the reference voltage VBGR, the comparator CMP1 outputs a high-level signal as the monitor signal COMP.

The booster circuit 15 shown in FIG. 1 boosts the voltage VIN_N supplied from the voltage source N. When the voltage sources 11_1 to 11_N are connected in series, the voltage source N that supplies a voltage to the booster circuit 15 has a negative terminal thereof connected to a ground potential. The voltage VCP that is boosted by the booster circuit 15 is supplied to the switch circuit 12.

Figure 8:
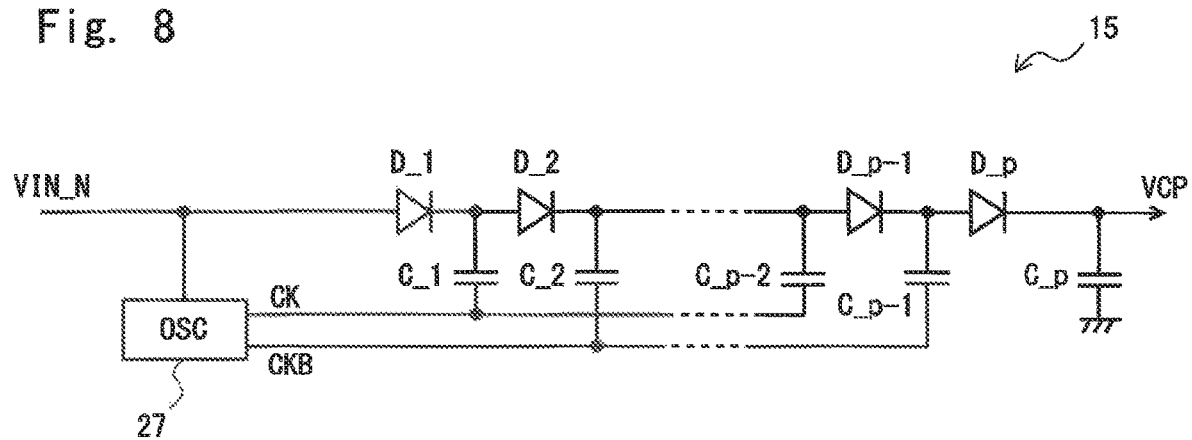
FIG. 8 is a circuit diagram showing an example of a booster circuit provided in the power supply circuit according to Embodiment 1.

FIG. 8 is a circuit diagram showing an example of the booster circuit 15. As shown in FIG. 8, the booster circuit has diodes D_1 to D_p, capacitors C_1 to C_p, and an oscillator circuit 27. The diodes D_1 to D_p are connected in series. The voltage VIN_N of the voltage source N is supplied to an anode of the diode D_1. The boosted voltage VCP is output from a cathode of the diode D_p. One end of a capacitor C_i is connected to a cathode of a diode D_i (i is a value of 1 to p). A clock signal CK or clock signal CKB generated by the oscillator circuit 27 is supplied to the other end of the capacitor C_i (i is a value of 1 to p−1). The clock signal CKB is an inversion of the clock signal CK. The other end of the capacitor C_p is connected to a ground potential. The booster circuit 15 shown in FIG. 8 is a charge pump circuit and boosts the voltage VIN_N of the voltage source N in response to the clock signals CK, CKB.

Figure 9:
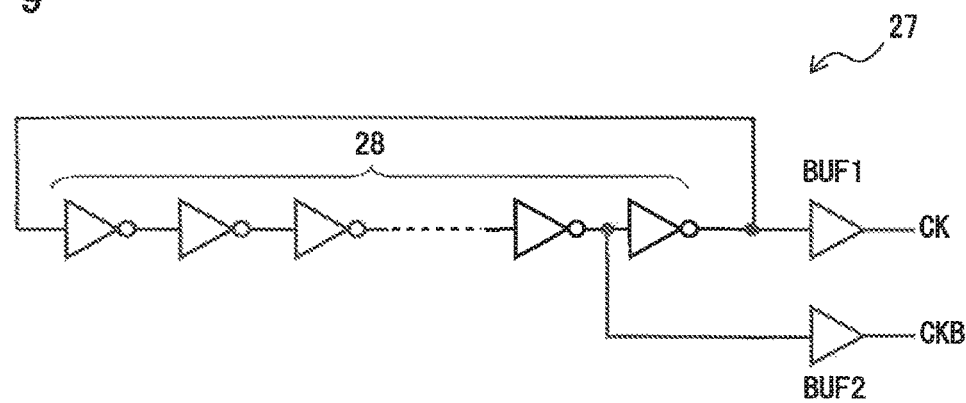
FIG. 9 is a circuit diagram showing an example of an oscillator circuit provided in the booster circuit shown in FIG. 8.

FIG. 9 is a circuit diagram showing an example of the oscillator circuit 27 provided in the booster circuit 15 shown in FIG. 8. As shown in FIG. 9, the oscillator circuit 27 has a ring oscillator in which an odd number of inverters 28 are connected in the form of a ring. An output of the inverter at the last stage of the odd number of inverters 28 is connected to a buffer BUF1, and the clock signal CK is output from the buffer BUF1. An input of the inverter at the last stage of the odd number of inverters 28 is connected to a buffer BUF2, and a clock signal CKB is output from the buffer BUF2.

Figure 10:
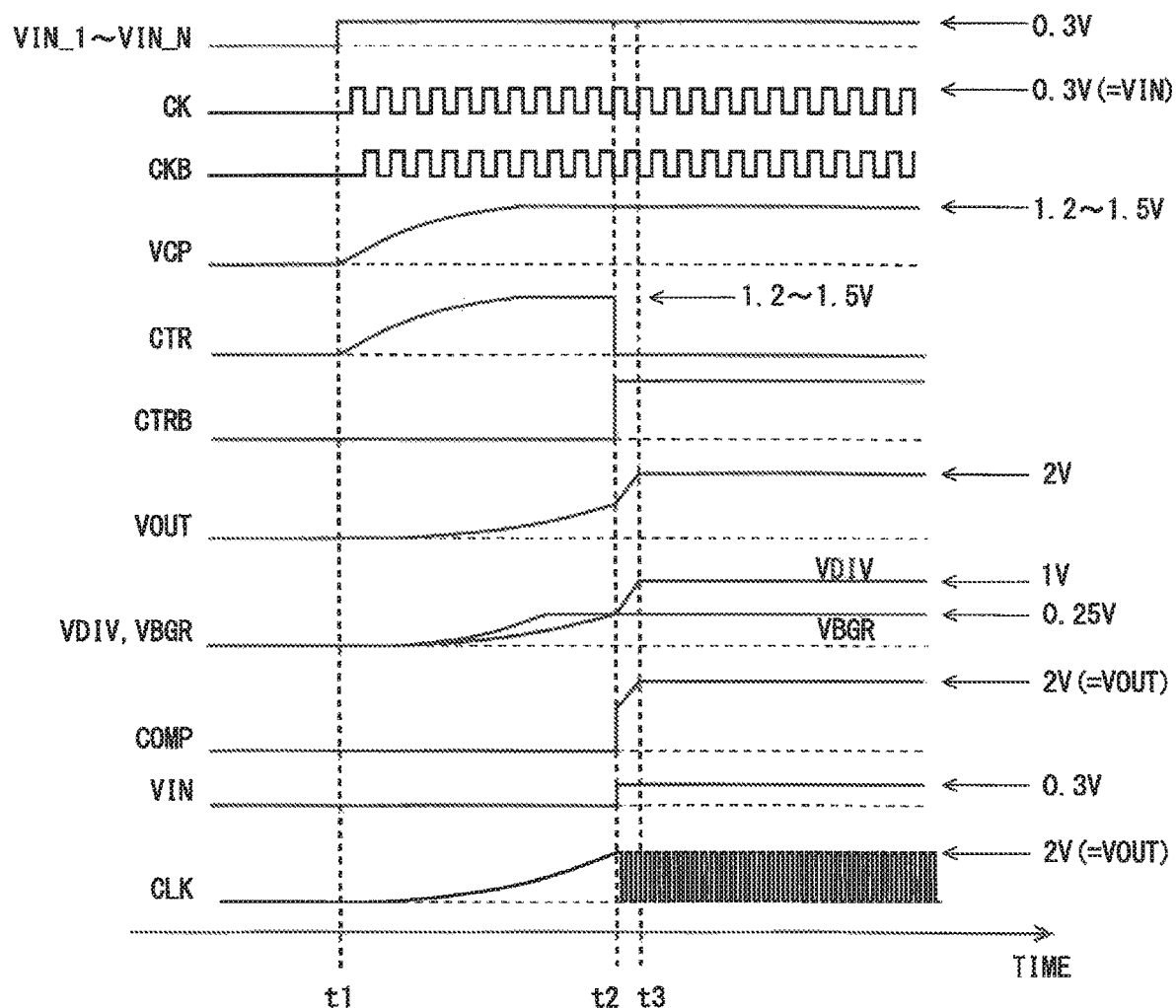
FIG. 10 is a timing chart for explaining operations of the power supply circuit according to Embodiment 1.

Next, operations of the power supply circuit 1 shown in FIG. 1 are described using the timing chart shown in FIG. 10. In a state in which the voltages VIN_1 to VIN_N are not supplied from the respective voltage sources 11_1 to 11_N, the output voltage VOUT is 0.

At a timing t1 when the voltages VIN_1 to VIN_N are supplied from the respective voltage sources 11_1 to 11_N, the booster circuit 15 starts operating. In other words, the oscillator circuit 27 of the booster circuit 15 shown in FIG. 8 starts operating, supplying the clock signals CK, CKB. As a result, the output voltage VCP of the booster circuit 15 starts rising. At this point, the voltage VCP is supplied to the control circuit 17 (see FIG. 2) of the switch circuit 12. Thus, the control circuit 17 starts supplying a high-level ("1") signal as the control signal CTR. In other words, the control signal CTR rises as the voltage VCP rises.

When the control signal CTR is at a high level ("1"), the transistors Tr_OUT and Tra_1 to Tra_N−1 of the switch circuit 12 are ON. Because the control signal CTRB is at a low level ("0") at this moment, the transistors Trb_1 to Trb_N and Trc_1 to Trc-N−1 of the switch circuit 12 are OFF. Therefore, the voltage sources 11_1 to 11_N are connected in series. The output OUT_S of the plurality of serially connected voltage sources 11_1 to 11_N is supplied to the output node VOUT of the voltage control circuit 13. When the output voltage VCP of the booster circuit 15 is extremely low (approximately 0.1 V, for example), the value of the control signal CTR becomes indefinite.

When the output OUT_S of the plurality of serially connected voltage sources 11_1 to 11_N is supplied to the output node VOUT of the voltage control circuit 13, the capacitor C1 that is connected to the output node VOUT (i.e., the capacitor C1 of the voltage control circuit 13 shown in FIG. 4) becomes charged. As a result, the voltage of the output node VOUT starts rising.

Consequently, when the voltage VDIV of the voltage monitor circuit 14 shown in FIG. 6 (the voltage obtained by dividing the voltage of the output VOUT) starts rising as well. The comparator CMP1 compares the voltage VDIV with the reference voltage VBGR. When the voltage VDIV is lower than the reference voltage VBGR, the comparator CMP1 outputs a low-level ("0") signal as the monitor signal COMP. Thereafter, when the voltage VDIV (VOUT) gradually rises and becomes equal to or greater than the reference voltage VBGR at a timing t2, the level of the monitor signal COMP becomes high ("1").

When the level of the monitor signal COMP becomes high, the control circuit 17 of the switch circuit 12 shown in FIG. 2 outputs a low-level signal as the control signal CTR and a high-level signal as the control signal CTRB. When the level of the control signal CTR becomes low, the transistors Tr_OUT and Tra_1 to Tra_N−1 of the switch circuit 12 are OFF. When the level of the control signal CTRB becomes high, the transistors Trb_1 to Trb_N and Trc_1 to Trc_N−1 of the switch circuit 12 are ON. Consequently, the voltage sources 11_1 to 11_N are connected in parallel, and the outputs OUT_1 to OUT_N of the respective voltage sources 11_1 to 11_N are output to the input node VIN. As a result, the voltage of the input node VIN rises. Because the voltage sources 11_1 to 11_N are connected in parallel at this moment, the voltage of the input node VIN becomes approximately 0.3 V.

Furthermore, when the level of the monitor signal COMP becomes high, the oscillator circuit 21 of the voltage control circuit 13 shown in FIG. 4 starts operating. Consequently, the clock signal CLK is supplied to the gate of the NMOS transistor Tr10 and the gate of the PMOS transistor Tr11, whereby a boosting operation is started by the voltage control circuit 13. As a result, the voltage output VOUT rises and then becomes constant at a timing t3, ending a rising operation of the power supply circuit 1. The voltage control circuit 13 outputs a constant voltage as the output voltage VOUT subsequent to the timing t3. For example, the output voltage VOUT at that time is approximately 2 V.

Note that the clock signal CLK generated by the oscillator circuit 21 of the voltage control circuit 13 is faster than the clock signals CK, CKB generated by the oscillator circuit 27 of the booster circuit 15. In other words, while the oscillator circuit 21 of the voltage control circuit 13 operates at the voltage of the output node VOUT (approximately 2 V), the oscillator circuit 27 of the booster circuit 15 operates at the voltage of the input node (approximately 0.3 V). For this reason, the clock signal CLK generated by the oscillator circuit 21 of the voltage control circuit 13 is faster.

For example, the booster circuit 15 can be configured with a charge pump circuit, while the voltage control circuit 13 can be configured with a switching regulator. In so doing, the frequency of the oscillator circuit 27 provided in the booster circuit 15 (charge pump circuit) is lower than the frequency of the oscillator circuit 21 provided in the voltage control circuit 13 (switching regulator).

As described in the background art, when an energy harvesting technology is used, the voltages obtained at the respective voltage sources are extremely small. It is therefore necessary to provide a voltage control circuit in order to boost the voltages of the respective voltage sources to the level where the electronics can be driven.

However, because the voltage output from each voltage source is extremely small, it takes time for the voltage control circuit to be activated after the voltage is supplied from each voltage source to the voltage control circuit. This brings about a problem that it takes time to activate the power supply circuit.

In other words, because the capacitor C1 is connected to the output node VOUT of the voltage control circuit 13, it takes time for the capacitor C1 connected to the output node VOUT to be charged after the voltages VIN_1 to VIN_N are supplied from the respective voltage sources 11_1 to 11_N (parallel connection). For this reason, it takes time for the voltage of the output node VOUT to rise.

In the power supply circuit 1 according to the present embodiment, the plurality of voltage sources 11_1 to 11_N are connected in series using the switch circuit 12 at the rise of the power supply circuit 1, and the output OUT_S of the plurality of serially connected voltage sources 11_1 to 11_N is supplied to the output node VOUT of the voltage control circuit 13. In other words, using the output OUT_S of the plurality of serially connected voltage sources 11_1 to 11_N, the capacitor C1 (see FIG. 4) connected to the output node VOUT of the voltage control circuit 13 is charged. Because the output voltage can be increased by connecting the plurality of voltage sources 11_1 to 11_N in series, the capacitor C1 can be charged at high speed. Therefore, the power supply circuit 1 (the voltage control circuit 13) can be raised at high speed.

In addition, in the power supply circuit 1 according to the present embodiment, after charging the capacitor C1 (i.e., after the voltage of the output node VOUT becomes equal to or greater than a predetermined voltage), the switch circuit 12 connects the plurality of voltage sources 11_1 to 11_N in parallel and supplies the outputs OUT_1 to OUT_N of the plurality of parallel-connected voltage sources 11_1 to 11_N to the input node VIN of the voltage control circuit 13. Therefore, even when the performance of one of the plurality of voltage sources 11_1 to 11_N drops (the output voltage or output current drops), the impact thereof on the input node VIN of the voltage control circuit 13 remains in the low-performance voltage source. Thus, the maximum power is input from the other voltage sources to the input node VIN of the voltage control circuit 13.

In other words, in the state in which the plurality of voltage source 11_1 to 11_N are connected in series, when the performance of one of the plurality of voltage sources 11_1 to 11_N drops, the impact thereof spreads through the entire voltage sources 11_1 to 11_N. As a result, the power that can be recovered by the plurality of voltage sources 11_1 to 11_N decreases significantly. On the other hand, in the state in which the plurality of voltage sources 11_1 to 11_N are connected in parallel, even when the performance of one of the voltage sources drops, the impact thereof on the input node VIN of the voltage control circuit 13 remains in the low-performance voltage source. Thus, the maximum power is input from the other voltage sources to the input node VIN of the voltage control circuit 13. Consequently, the power can efficiently be recovered from the plurality of voltage sources 11_1 to 11_N.

As described above, in the power supply circuit 1 according to the present embodiment, because the plurality of voltage sources 11_1 to 11_N are connected in series by means of the switch circuit 12 at the rise of the power supply circuit 1, the power supply circuit 1 (the voltage control circuit 13) can be raised at high speed. Furthermore, after the power supply circuit 1 is raised, the power can efficiently be recovered from the plurality of voltage sources 11_1 to 11_N because the plurality of voltage sources 11_1 to 11_N are connected in parallel.

Embodiment 2

Figure 11:
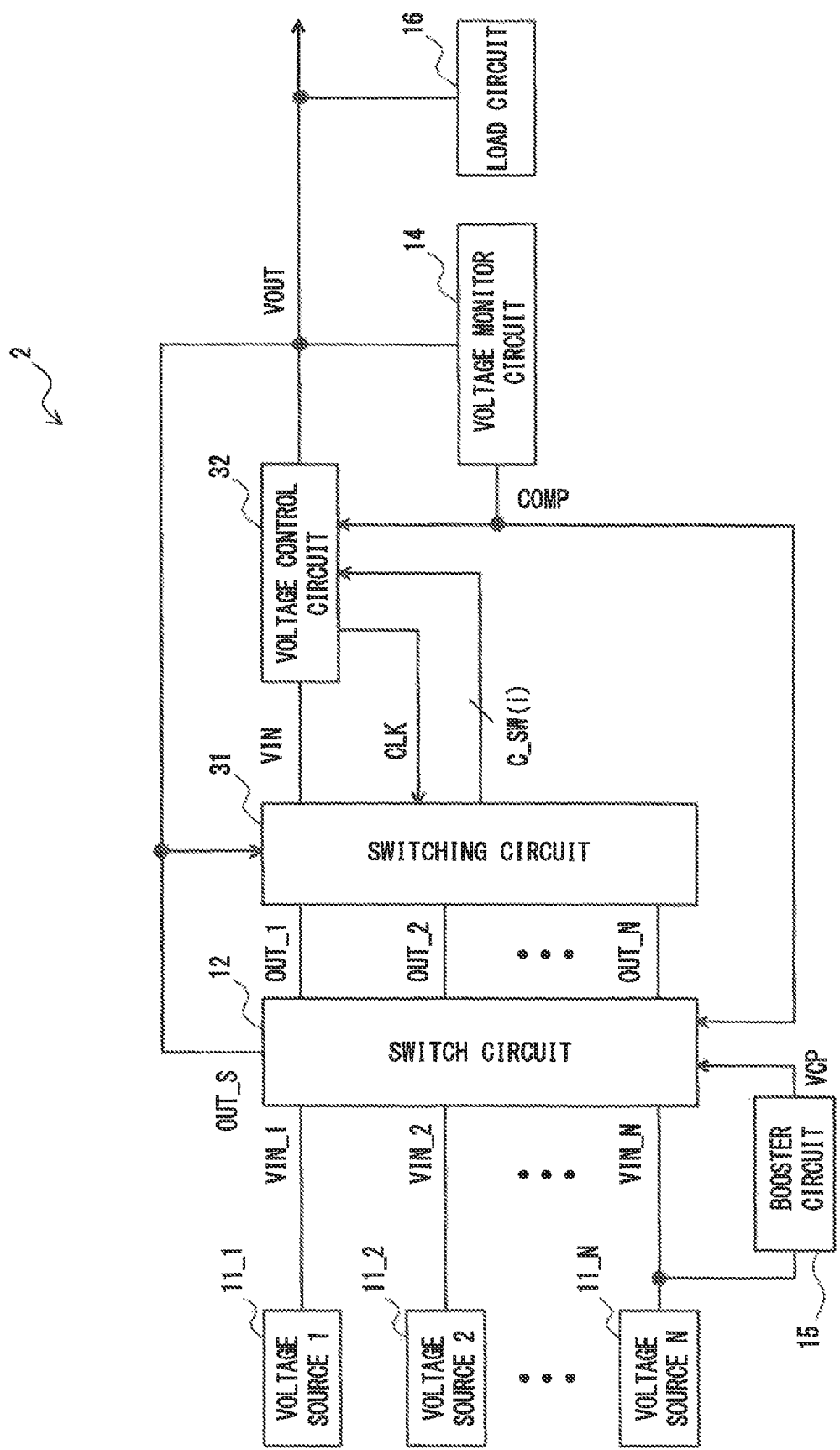
FIG. 11 is a block diagram showing a power supply circuit according to Embodiment 2.

Embodiment 2 is described next. FIG. 11 is a block diagram showing a power supply circuit 2 according to Embodiment 2. The power supply circuit 2 according to the present embodiment is different from the power supply circuit 1 according to Embodiment 1 in that the power supply circuit 2 has a switching circuit 31 and in the configuration of a voltage control circuit 32. The rest is the same as the power supply circuit 1 according to Embodiment 1; thus, the same reference numerals are used to denote the same components, and the overlapping explanations are omitted accordingly.

As shown in FIG. 11, the power supply circuit 2 according to the present embodiment has voltage sources 11_1 to 11_N (N is an integer of two or more), a switch circuit 12, a switching circuit 31, a voltage control circuit 32, a voltage monitor circuit 14, and a booster circuit 15. The poser supply circuit 2 supplies power to the load circuit 16. Note that the voltage sources 11_1 to 11_N, switch circuit 12, voltage monitor circuit 14, and booster circuit 15 are the same as those of Embodiment 1.

When the switch circuit 12 connects the plurality of voltage sources 11_1 to 11_N in parallel, the switching circuit 31 supplies outputs OUT_1 to OUT_N of the plurality of voltage sources 11_1 to 11_N to an input node VIN of the voltage control circuit 32. The switching circuit 31 uses an output voltage VOUT, output from the voltage control circuit 32, as a power supply.

Figure 12:
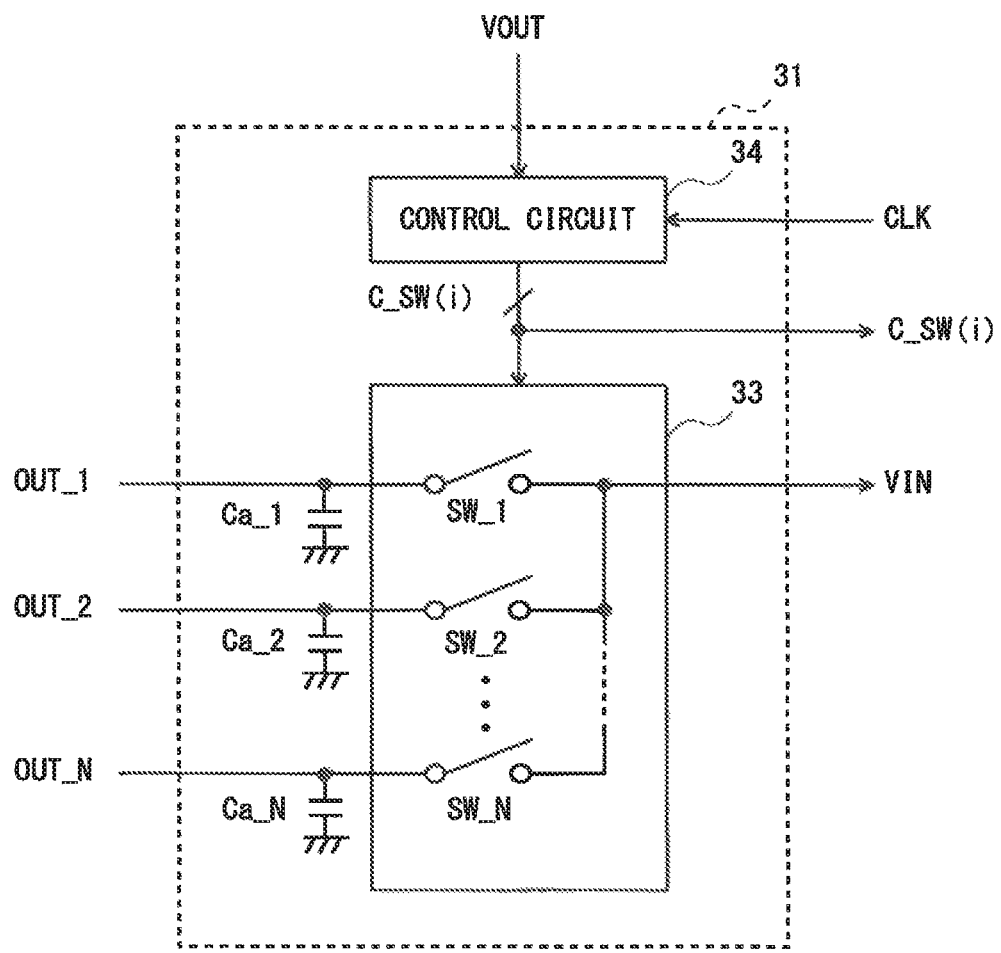
FIG. 12 is a circuit diagram showing an example of a switching circuit provided in the power supply circuit according to Embodiment 2.

FIG. 12 is a circuit diagram showing an example of the switching circuit 31. As shown in FIG. 12, the switching circuit 31 has a switch circuit 33 and a control circuit 34. The switch circuit 33 has switches SW_1 to SW_N. A switch SW_i (i is an integer from 1 to N) switches between the connected state and the non-connected state between an output OUT_i of the voltage source 11_i and the input node VIN of the voltage control circuit 32. The switch SW_i can be configured using, for example, a NMOS transistor. When the switch SW_i is configured with a NMOS transistor, a drain of the switch SW_i is connected to the output OUT_i of the voltage source 11_i, and a source of the switch SW_i to the input node VIN of the voltage control circuit 32. Capacitors Ca_1 to Ca_N are provided at the input sides of the switches SW_1 to SW_N respectively.

The switches SW_1 to SW_N are controlled using control signals C_SW(1) to C_SW(N) that are output from the control circuit 34. When the switches SW_1 to SW_N are each configured with a NMOS transistor, the control signals C_SW(1) to C_SW(N) are supplied to gates of the NMOS transistors. For example, when a control signal C_SW(i) is at a high level, the switch SW_i is ON, connecting the output OUT_i of the voltage source 11_i to the input node VIN of the voltage control circuit 32 (i is an integer from 1 to N). When, on the other hand, the control signal C_SW(i) is at a low level, the switch SW_i is OFF, establishing non-conduction between the output OUT_i of the voltage source 11_i and the input node VIN of the voltage control circuit 32.

The control circuit 34 generates the control signals C_SW (1) to C_SW (N) in such a manner that the switches SW_1 to SW_N are turned ON sequentially. A clock signal CLK is supplied from the voltage control circuit 32 to the control circuit 34.

The voltage control circuit 32 shown in FIG. 11 boosts a voltage supplied to the input node VIN, and the boosted voltage is output to the output node VOUT. At this point, the voltage control circuit 32 controls the boosting ratio according to the voltage sources 11-1 to 11_N (outputs OUT_1 to OUT_N) connected to the input node VIN of the voltage control circuit 32.

Figure 13:
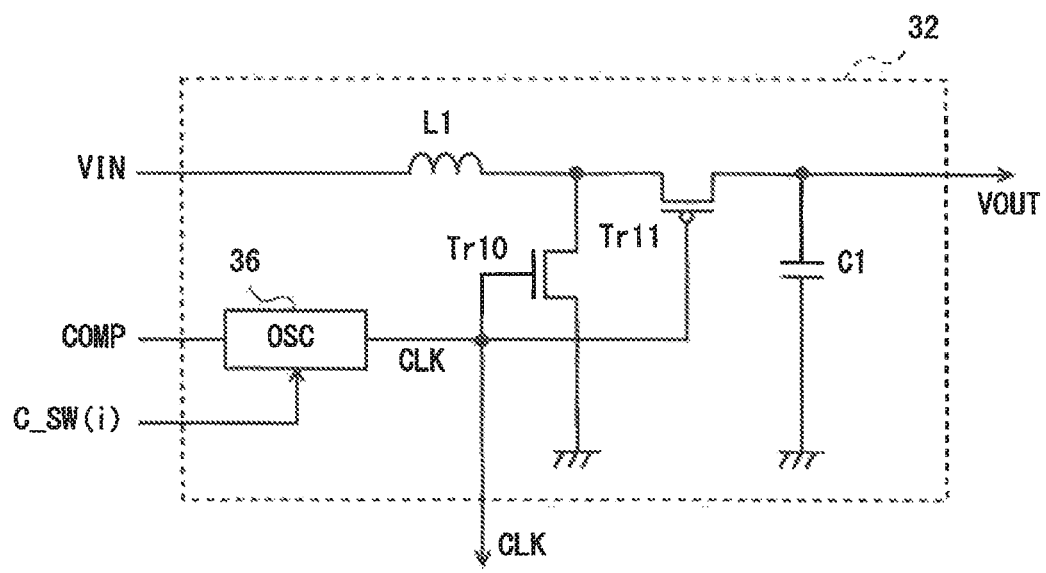
FIG. 13 is a circuit diagram showing an example of a voltage control circuit provided in the power supply circuit according to Embodiment 2.

FIG. 13 is a circuit diagram showing an example of the voltage control circuit 32. As shown in FIG. 13, the voltage control circuit 32 can be configured using a switching regulator having an inductor L1, a NMOS transistor Tr10, a PMOS transistor Tr11, a capacitor C1, and an oscillator circuit 36.

When a monitor signal COMP that is output from the voltage monitor circuit 14 is at a high level, the oscillator circuit 36 generates a clock signal CLK and outputs the generated clock signal CLK to a gate of the NMOS transistor Tr10 and a gate of the PMOS transistor Tr11. In so doing, the oscillator circuit 36 adjusts the duty ratio of the clock signal CLK in response to a control signal C_SW(i) supplied to the oscillator circuit 36. The rest of the configuration of the voltage control circuit 32 is the same as that of the voltage control circuit 13 shown in FIG. 4; thus, the overlapping explanations are omitted accordingly.

The output voltage VOUT of the voltage control circuit 32 is determined in accordance with the duty ratio of the clock signal CLK. The duty ratio of the clock signal CLK here can be obtained by the following calculation: high level time period/(high level time period+low level time period). The greater the duty ratio of the clock signal CLK, the higher the output voltage VOUT of the voltage control circuit 32 becomes.

The voltage control circuit 32 adjusts the duty ratio of the clock signal CLK in accordance with the control signal C_SW(i) supplied to the oscillator circuit 36. This enables controlling of the boosting ratio in accordance with the voltage source 11_i (output OUT_i) connected to the input node VIN of the voltage control circuit 32.

In other words, because the control signal C_SW(i) is supplied to the voltage control circuit 32, the voltage control circuit 32 can grasp the voltage source 11_i (output OUT_i) that is connected to the input node VIN of the voltage control circuit 32. Therefore, the oscillator circuit 36 of the voltage control circuit 32 can generate a clock signal CLK that leads to boosting of the voltage of the voltage source 11_i (output OUT_i) to the predetermined output voltage VOUT (constant voltage).

For example, when the voltage of the voltage source 11_1 (output OUT_1) is lower than the voltage of the voltage source 11_2 (output OUT_2), the boosting ratio of the voltage source 11_1 needs to be made greater than the boosting ratio of the voltage source 11_2 in order to boost the voltage of the voltage source 11_1 and the voltage of the voltage source 11_2 to the predetermined output voltage VOUT (constant voltage). In this case, the voltage control circuit 32 makes the duty ratio of the clock signal CLK that is obtained when the voltage source 11_1 is connected to the input node VIN, greater than the duty ratio of the clock signal CLK obtained when the voltage source 11_2 is connected to the input node VIN.

Figure 14:
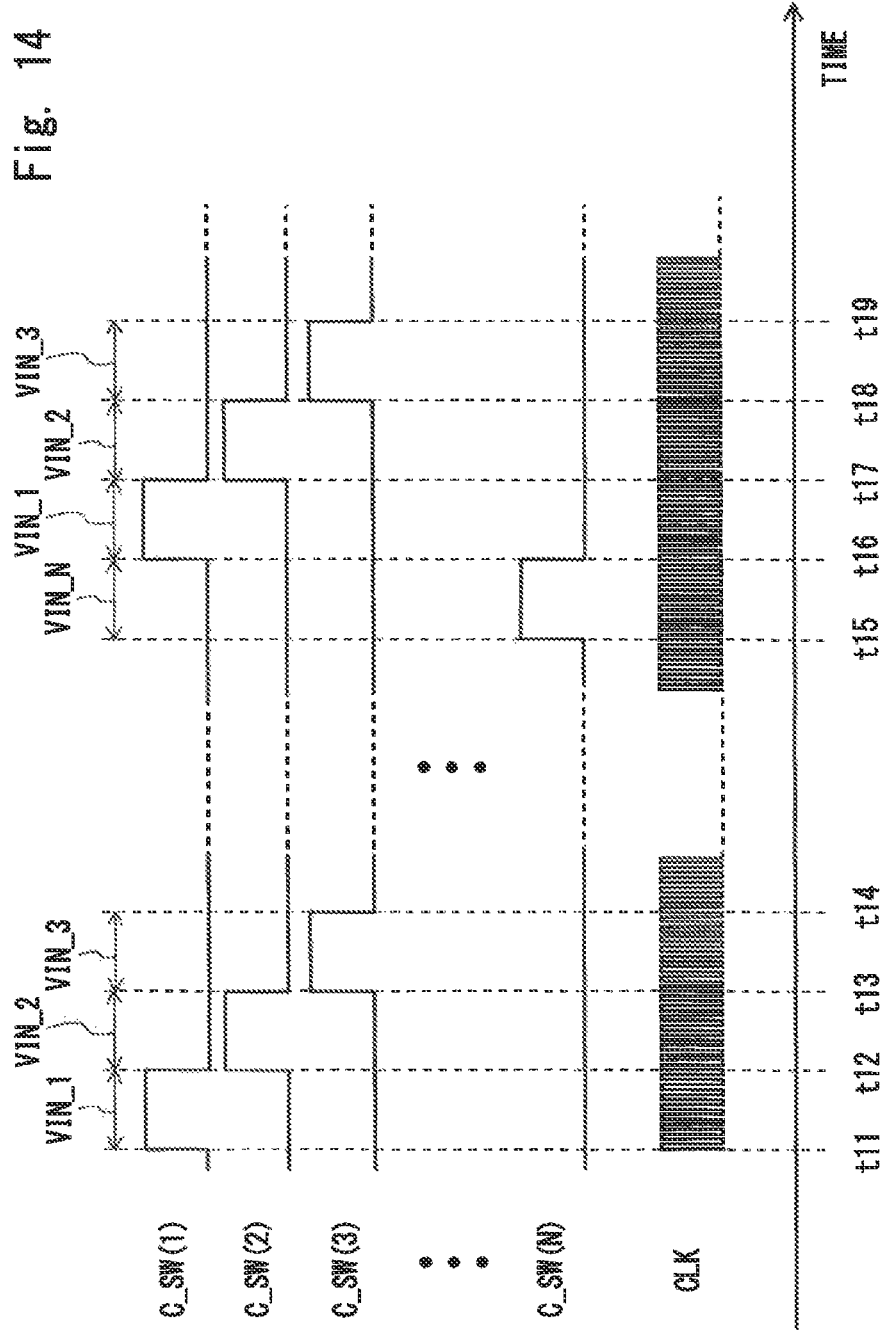
FIG. 14 is a timing chart for explaining operations of the power supply circuit according to Embodiment 2.

Operations of the power supply circuit 2 according to the present embodiment are described next. FIG. 14 is a timing chart for explaining the operations of the power supply circuit 2. The timing chart shown in FIG. 14 shows the operations performed when the switch circuit 12 connects the plurality of voltage sources 11_1 to 11_N in parallel, the operations being performed after the timing t3 of the timing chart shown in FIG. 10. Note that a rising operation of the power supply circuit 2 according to the present embodiment is the same as the rising operation of the power supply circuit 1 described in Embodiment 1 (see FIG. 10); thus, the overlapping explanations are omitted accordingly.

The switch circuit 12 provided in the power supply circuit 2 connects the plurality of voltage sources 11_1 to 11_N in parallel when the voltage of the output node VOUT becomes equal to or greater than a predetermined voltage, and supplies the outputs OUT_1 to OUT_N of the plurality of parallel-connected voltage sources 11_1 to 11_N to the switching circuit 31.

After the switch circuit 12 connects the plurality of voltage sources 11_1 to 11_N in parallel, the control circuit 34 provided in the switching circuit 31 supplies a high-level signal to the switch circuit 33 and voltage control circuit 32 as the control signal C_SW(1) at a timing t11. As a result, the switch SW_1 becomes ON, and the output OUT_1 of the voltage source 11_1 is supplied to the input node VIN of the voltage control circuit 32. At this point, the outputs OUT_2 to OUT_N of the other voltage sources 11_2 to 11_N charge the capacitors Ca_2 to Ca_N.

The oscillator circuit 36 provided in the voltage control circuit 32 (see FIG. 13) generates a clock signal CLK in response to the control signal C_SW(1). In other words, the oscillator circuit 36 generates a clock signal CLK that has a duty ratio that leads to boosting of the voltage VIN_1 of the voltage source 11_1 corresponding to the control signal C_SW(1) to the output voltage VOUT (constant voltage). Consequently, the output voltage VOUT obtained as a result of boosting the voltage of the voltage source 11_1 is output from the voltage control circuit 32 during a time period VIN_1 during which the control signal C_SW(1) is at a high level (between timings t11 and t12).

Subsequently, the control circuit 34 provided in the switching circuit 31 (see FIG. 12) supplies a high-level signal to the switch circuit 33 and voltage control circuit 32 as a control signal C_SW(2) at the timing t12. As a result, a switch SW 2 becomes ON (the switch SW_1 becomes OFF), and the output OUT_2 of the voltage source 11_2 is supplied to the input node VIN of the voltage control circuit 32. At this moment, the power that is stored in the capacitor Ca_2 connected to the output OUT_2 is also supplied to the input node VIN of the voltage control circuit 32. The outputs OUT_1 and OUTS_3 to OUT_N of the other voltage sources 11_1 and 11_3 to 11_N charge the capacitors Ca_1 and Ca 3 to Ca_N.

The oscillator circuit 36 provided in the voltage control circuit 32 (see FIG. 13) generates a clock signal CLK that has a duty ratio that leads to boosting of the voltage VIN_2 of the voltage source 11_2 corresponding to the control signal C_SW(2) to the output voltage VOUT (constant voltage). Consequently, the output voltage VOUT obtained by boosting the voltage of the voltage source 11_2 is output from the voltage control circuit 32 during a time period VIN_2 during which the control signal C_SW(2) is at a high level (between the timings t12 and t13).

Subsequently, the levels of the control signals C_SW(3) to C_SW(N) become high sequentially, resulting in outputting of the output voltage VOUT, obtained by boosting the voltage of each of the voltage sources 11_3 to 11_N, sequentially from the voltage control circuit 32. Then, after a cycle of the control signals C_SW(1) to C_SW(N) (the voltage sources 11_1 to 11_N), the level of the control signal C_SW(1) becomes high again (timing t16).

In the power supply circuit 1 according to Embodiment 1, when the switch circuit 12 connected the plurality of voltage sources 11_1 to 11_N in parallel, the outputs OUT_1 to OUT_N of the plurality of voltage sources 11_1 to 11_N were supplied simultaneously to the input node VIN of the voltage control circuit 13. However, due to the variations in the output voltages of the plurality of voltage sources 11_1 to 11_N, the problem with supplying the outputs OUT_1 to OUT_N of the plurality of voltage sources 11_1 to 11_N simultaneously to the input node VIN is that the voltages of the respective voltage sources 11_1 to 11_N cannot be boosted efficiently by the voltage control circuit 13.

In the power supply circuit 2 according to the present embodiment, the switching circuit 31 is provided in order to supply the outputs OUT_1 to OUT_N of the plurality of voltage sources 11_1 to 11_N sequentially to the voltage control circuit 32. In addition, the boosting ratio of the voltage control circuit 32 (the duty ratios of the clock signal CLK) is adjusted according to the voltage value of each of the voltage sources 11_1 to 11_N. In this manner, the voltages of the respective voltage sources 11_1 to 11_N can be boosted efficiently.

For example, when the output voltages of the voltage sources 11_1 to 11_m (1<m<N) are 0.1 V, the output voltages of the voltage sources 11_m+1 to 11_N are 0.2 V, and the output voltage of the voltage control circuit 32 is 1.5 V, the duty ratio of the clock signal CLK is set at 0.93 and the boosting ratio at 15 when the voltage sources 11_1 to 11_m are connected to the voltage control circuit 32. When the voltage sources 11_m+1 to 11_N are connected to the voltage control circuit 32, the duty ratio of the clock signal CLK is set at 0.87 and the boosting ratio at 7.5. As a result, the voltages of the respective voltage sources 11_1 to 11_N can efficiently be boosted.

Embodiment 3

Figure 15:
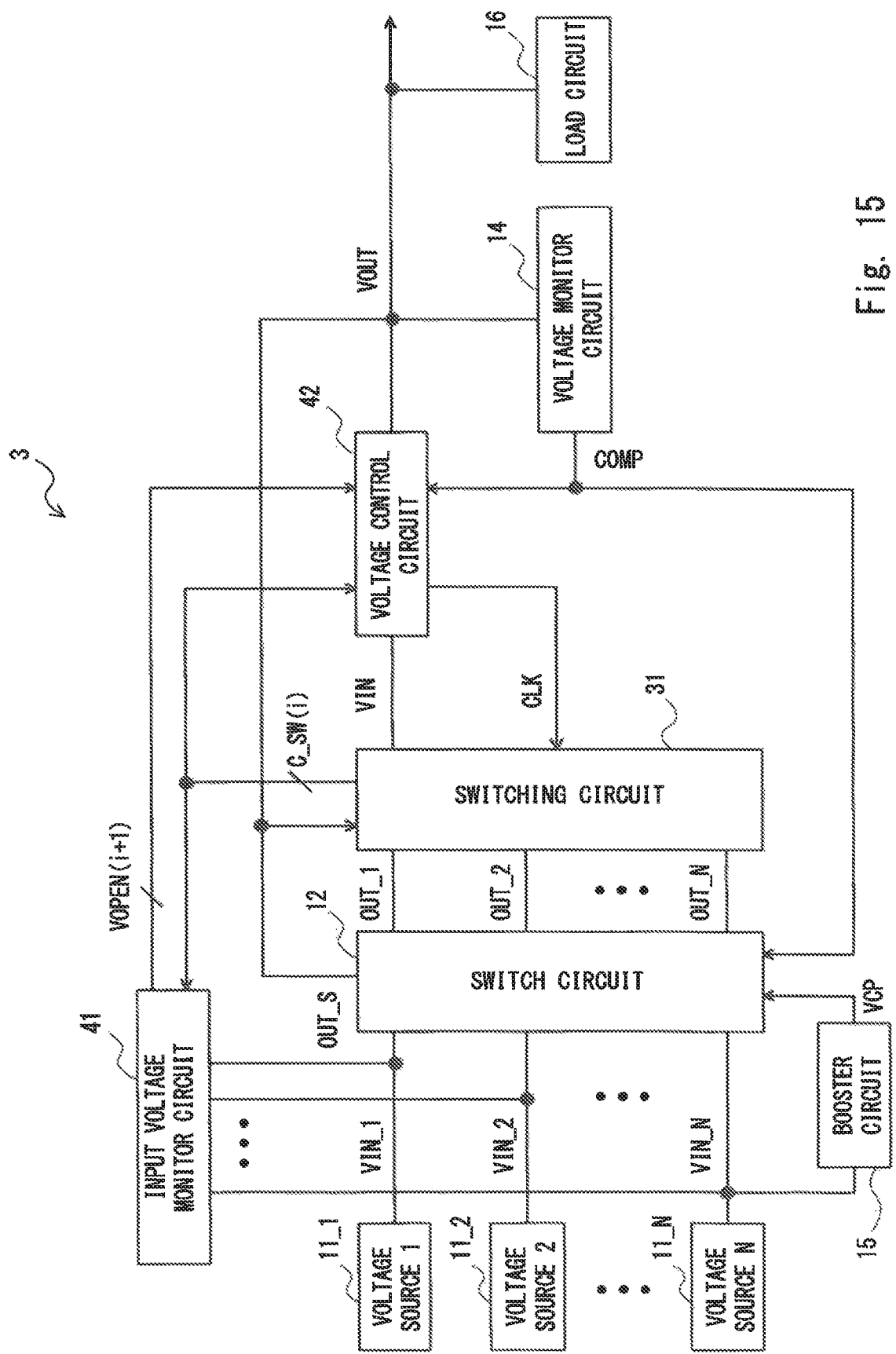
FIG. 15 is a block diagram showing a power supply circuit according to Embodiment 3.

Embodiment 3 is described next. FIG. 15 is a block diagram showing a power supply circuit 3 according to Embodiment 3. The power supply circuit 3 according to the present embodiment is different from the power supply circuit 2 according to Embodiment 2 in that the power supply circuit 3 has an input voltage monitor circuit 41 and in terms of the configuration of a voltage control circuit 42.

The rest is the same as the power supply circuits 1 and 2 according to Embodiments 1 and 2; thus, the same reference numerals are used to denote the same components, and the overlapping explanations are omitted accordingly.

As shown in FIG. 15, the power supply circuit 3 according to the present embodiment has voltage sources 11_1 to 11_N (N is an integer of 2 or more), an input voltage monitor circuit 41, switch circuit 12, switching circuit 31, voltage control circuit 42, voltage monitor circuit 14, and booster circuit 15. The voltage supply circuit 3 supplies power to the load circuit 16. Note that the voltage sources 11_1 to 11_N, the switch circuit 12, the switching circuit 31, the voltage monitor circuit 14, and the booster circuit 15 are the same as those described in Embodiments 1 and 2.

The input voltage monitor circuit 41 monitors each of voltages VIN_1 to VIN_N of the plurality of voltage sources 11_1 to 11_N and outputs monitor results VOPEN(1) to VOPEN(N) to the voltage control circuit 42. In other words, the input voltage monitor circuit 41 measures the voltages VIN_1 to VIN_N of the plurality of voltage sources 11_1 to 11_N sequentially, and outputs the values of the measured voltages VIN_1 to VIN_N as the monitor results VOPEN(1) to VOPEN(N) sequentially to the voltage control circuit 42.

Figure 16:
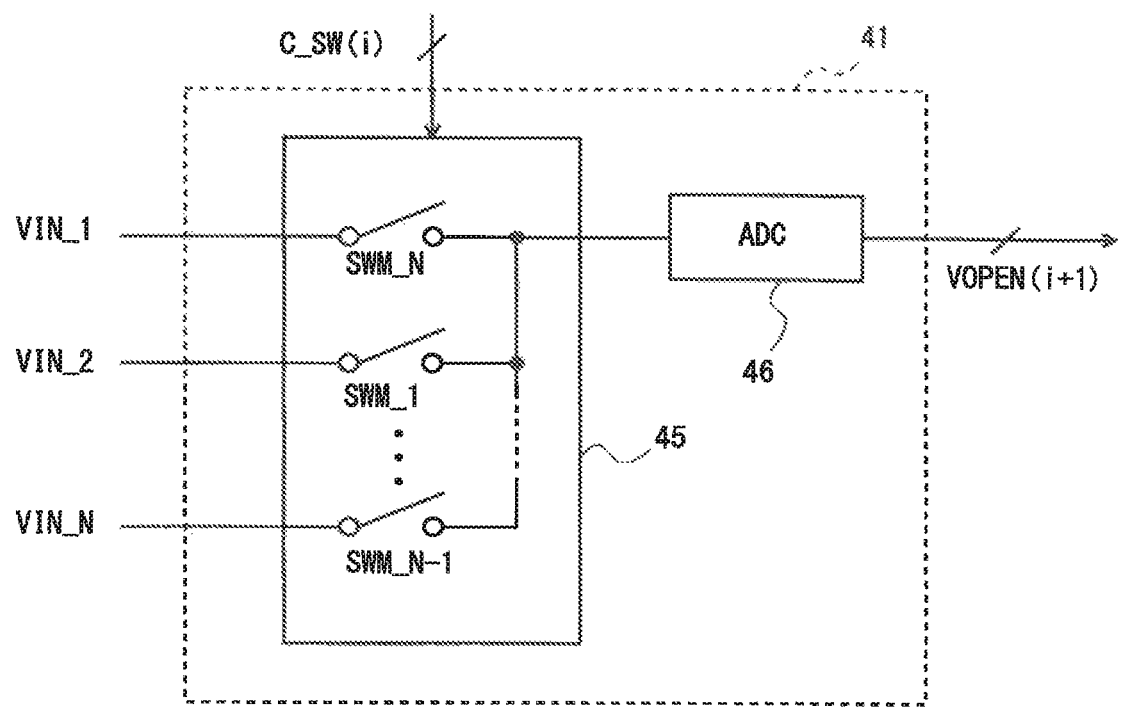
FIG. 16 is a circuit diagram showing an example of an input voltage monitor circuit provided in the power supply circuit according to Embodiment 3.

FIG. 16 is a circuit diagram showing an example of the input voltage monitor circuit 41. As shown in FIG. 16, the input voltage monitor circuit 41 has a switch circuit 45 and an AD converter 46. The switch circuit 45 has N switches SWM_i (i is an integer of 1 to N). A switch SWM_N switches between the connected state and the non-connected state between the voltage source 11_1 and the AD converter 46. A switch SWM_1 switches between the connected state and the non-connected state between the voltage source 11_2 and the AD converter 46. Similarly, a switch SWM_i switches between the connected state and the non-connected state between a voltage source 11_i+1 and the AD converter 46.

The switch SWM_i can be configured using, for example, a NMOS transistor. When the switch SWM_i is configured with a NMOS transistor, a drain of the switch SWM_i is connected to the voltage source 11_i+1, and a source of the switch SWM_i is connected to the AD converter 46.

The switch SWM_i is controlled using a control signal C_SW(i) that is output from the switching circuit 31. When the switch SWM_i is configured with a NMOS transistor, the control signal C_SW(i) is supplied to a gate of each NMOS transistor. For instance, when the control signal C_SW(i) is at a high level, the switch SWM_i is ON, and an output of the voltage source 11_i+1 is connected to the AD converter 46. When, on the other hand, the control signal C_SW(i) is at a low level, the switch SWM_i is OFF, and the output of the voltage source 11_i+1 is disconnected from the AD converter 46.

The AD converter 46 converts the voltage values of the respective supplied voltage sources 11_1 to 11_N (analogue values) into digital values, and outputs the converted voltage values (digital values) as the monitor results VOPEN(1) to VOPEN(N) to the voltage control circuit 42.

In the input voltage monitor circuit 41 shown in FIG. 16, when the control signal C_SW(1) is at a high level, the switch SWM_1 is ON, and the voltage VIN_2 of the voltage source 11_2 is supplied to the AD converter 46. Here, the control signal C_SW(1) corresponds to the output OUT_1 of the voltage source 11_1 that is currently selected by the switching circuit 31. Consequently, the input voltage monitor circuit 41 supplies the voltage VIN_2 of the voltage source 11_2, next to the voltage source 11_1 that is currently selected by the switching circuit 31, to the AD converter 46.

In other words, the input voltage monitor circuit 41 is configured to monitor the voltage of a predetermined voltage source that is selected next by the switching circuit 31.

The voltage control circuit 42 shown in FIG. 15 controls the boosting ratios of the voltages VIN_1 to VIN_N of the voltage sources 11_1 to 11_N according to the monitor results VOPEN(1) to VOPEN(N) of the input voltage monitor circuit 41. For example, the voltage control circuit 42 sets the boosting ratios thereof in such a manner that the lower the voltages VIN_1 to VIN_N of the voltage sources 11_1 to 11_N, the higher the boosting ratios in the voltage control circuit 42.

Figure 17:
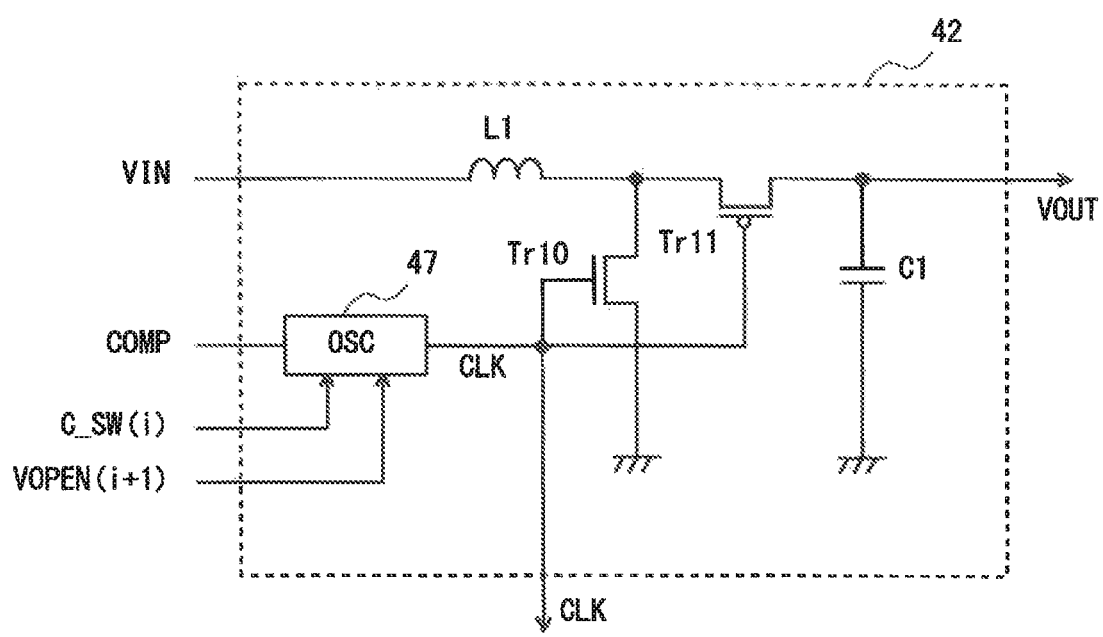
FIG. 17 is a circuit diagram showing an example of a voltage control circuit provided in the power supply circuit according to Embodiment 3.

FIG. 17 is a circuit diagram showing an example of the voltage control circuit 42. As shown in FIG. 17, the voltage control circuit 42 can be configured using a switching regulator that has an inductor L1, a NMOS transistor Tr10, a PMOS transistor Tr11, a capacitor C1, and an oscillator circuit 47.

When the monitor signal COMP that is output from the voltage monitor circuit 14 is at a high level, the oscillator circuit 47 generates a clock signal CLK and outputs the generated clock signal CLK to a gate of the NMOS transistor Tr10 and a gate of the PMOS transistor Tr11. In so doing, the oscillator circuit 47 adjusts the duty ratio of the clock signal CLK according to a monitor result VOPEN(i) that is supplied from the input voltage monitor circuit 41. Consequently, the boosting ratio of the voltage control circuit 42 can be controlled in accordance with the voltage of the voltage source 11_i (output OUT_i) connected to the input node VIN of the voltage control circuit 42. At this moment, the oscillator circuit 47 can grasp the voltage source that is currently connected to the input node VIN of the voltage control circuit 42, based on the control signal C_SW(i) supplied to the oscillator circuit 47. The rest of the configuration of the voltage control circuit 42 is the same as those of the voltage control circuits 13 and 32 shown in FIGS. 4 and 13; thus, the overlapping explanations are omitted accordingly.

Figure 18:
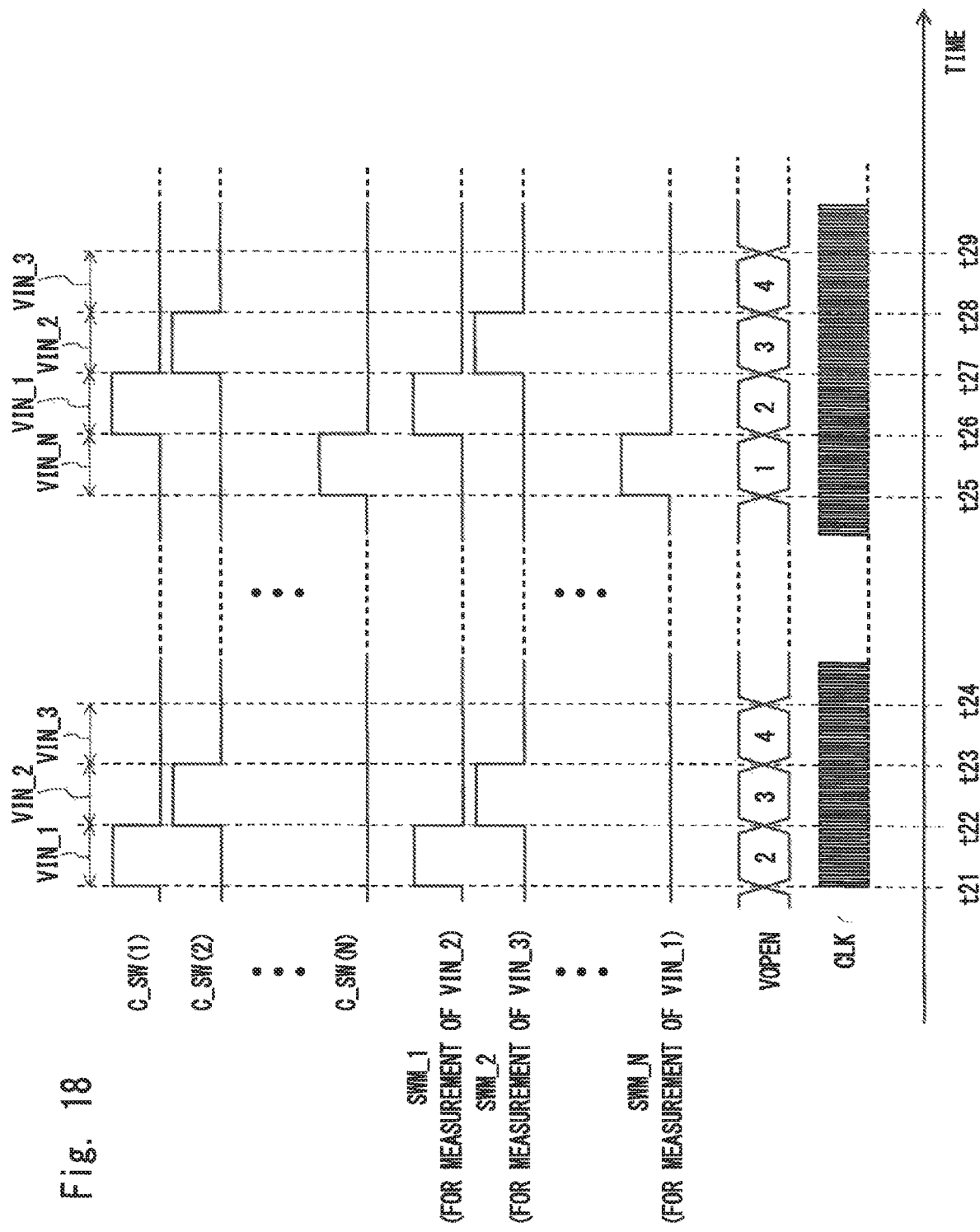
FIG. 18 is a timing chart for explaining operations of the power supply circuit according to Embodiment 3.

Operations of the power supply circuit 3 according to the present embodiment are described next. FIG. 18 is a timing chart for explaining the operations of the power supply circuit 3. The timing chart shown in FIG. 18 shows the operations performed when the switch circuit 12 connects the plurality of voltage sources 11_1 to 11_N in parallel, the operations being performed after the timing t3 of the timing chart shown in FIG. 10. Note that a rising operation of the power supply circuit 3 according to the present embodiment is the same as the rising operation of the power supply circuit 1 described in Embodiment 1 (see FIG. 10); thus, the overlapping explanations are omitted accordingly.

The switch circuit 12 provided in the power supply circuit 3 connects the plurality of voltage sources 11_1 to 11_N in parallel after the voltage of the output node VOUT becomes equal to or greater than a predetermined voltage, and supplies the outputs OUT_1 to OUT_N of the plurality of parallel-connected voltage sources 11_1 to 11_N to the switching circuit 31.

After the switch circuit 12 connects the plurality of voltage sources 11_1 to 11_N in parallel, the switching circuit 31 supplies a high-level signal as the control signal C_SW(1) to the input voltage monitor circuit 41 and the voltage control circuit 42 at a timing t21. Consequently, the switch SWM_1 of the input voltage monitor circuit 41 becomes ON, and the digital value of the voltage VIN_2 of the voltage source 11_2 is supplied as a monitor result VOPEN(2) to the voltage control circuit 42.

Also at this moment, the output OUT_1 of the voltage source 11_1 is connected to the input node VIN of the voltage control circuit 42. The oscillator circuit 47 provided in the voltage control circuit 42 generates a clock signal CLK based on the monitor result VOPEN(1) that is acquired in the previous phase(N). In other words, the oscillator circuit 47 generates a clock signal CLK that has a duty ratio that leads to boosting of the voltage of the voltage source 11_1 to a predetermined output voltage VOUT (constant voltage). Consequently, the output voltage VOUT, obtained by boosting the voltage of the voltage source 11_1, is output from the voltage control circuit 42 during the time period VIN_1 during which the control signal C_SW(1) is at a high level (between timings t21 and t22).

Thereafter, the switching circuit 31 supplies a high-level signal as the control signal C_SW(2) to the input voltage monitor circuit 41 and the voltage control circuit 42 at the timing t22. As a result, the switch SWM_2 of the input voltage monitor circuit 41 becomes ON, and the digital value of the voltage VIN_3 of the voltage source 11_3 is supplied to the voltage control circuit 42 as a monitor result VOPEN(3).

Also at this moment, the output OUT_2 of the voltage source 11_2 is connected to the input node VIN of the voltage control circuit 42. The oscillator circuit 47 provided in the voltage control circuit 42 generates a clock signal CLK based on the monitor result VOPEN(2) that is acquired in the previous phase(1) (t21 to t22). In other words, the oscillator circuit 47 generates a clock signal CLK that has a duty ratio that leads to boosting of the voltage of the voltage source 11_2 to the predetermined output voltage VOUT (constant voltage). In this manner, the output voltage VOUT, obtained by boosting the voltage of the voltage source 11_2, is output from the voltage control circuit 42 during the time period VIN_2 (between the timings t22 and t23) during which the control signal C_SW(2) is at a high level.

Subsequently, the levels of the control signals C_SW(3) to C_SW(N) become high sequentially, and the output voltages VOUT, obtained by boosting the voltages of the voltage sources 11_3 to 11_N, are output sequentially from the voltage control circuit 42. Then, after a cycle of the control signals C_SW(1) to C_SW(N) (the voltage sources 11_1 to 11_N), the level of the control signal C_SW(1) becomes high again (timing t26).

In the power supply circuit 3 according to the present embodiment, the input voltage monitor circuit 41 is provided in order to monitor the voltages VIN_1 to VIN_N of the plurality of voltage sources 11_1 to 11_N. Furthermore, the voltage control circuit 42 controls the boosting ratios of the voltages VIN_1 to VIN_N of the voltage sources 11_1 to 11_N in accordance with the monitor results of the input voltage monitor circuit 41. Therefore, even when the voltage values of the respective voltage sources 11_1 to 11_N are unknown, the voltages of the voltage sources 11_1 to 11_N can be boosted at an optimal boosting ratio for each of the voltage sources 11_1 to 11_N, improving the power efficiency.

Embodiment 4

Embodiment 4 is described next. Embodiment 4 describes a configuration example of a power supply system that uses the power supply circuits 1 to 3 described in Embodiments 1 to 3, which, specifically, is an energy harvesting system having the power supply circuits 1 to 3 of Embodiments 1 to 3 mounted in semiconductor chips.

Figure 19:
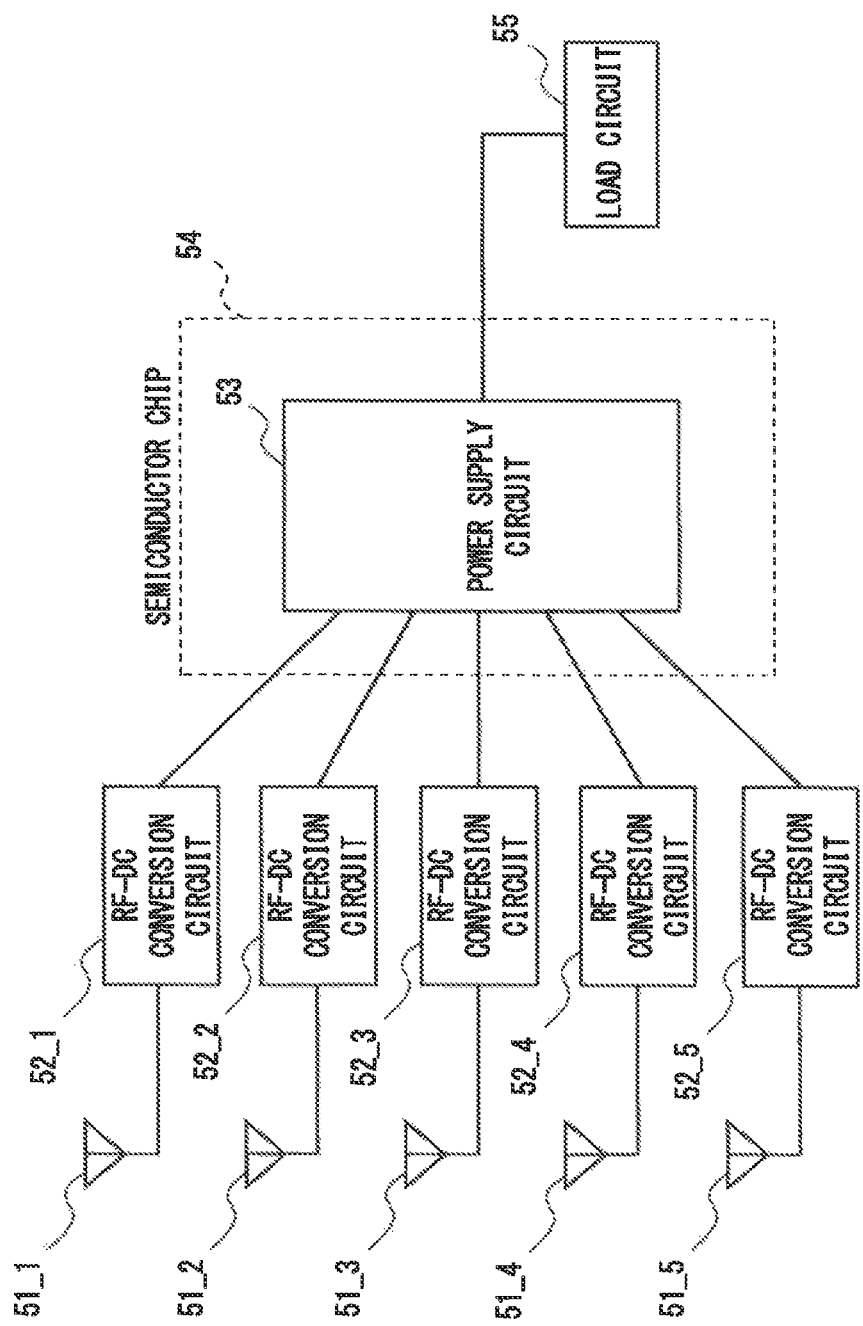
FIG. 19 is a block diagram showing an example of a power supply system according to Embodiment 4.

FIG. 19 is a block diagram showing an example of a power supply system according to the present embodiment. As shown in FIG. 19, the power supply system according to the present embodiment has antennas 51_1 to 51_5, RF-DC conversion circuits 52_1 to 52_5, a power supply circuit 53, and a load circuit 55. The antennas 51_1 to 51_5 and the RF-DC conversion circuits 52_1 to 52_5 are in a correspondence relation with the voltage sources 11_1 to 11_N described in Embodiments 1 to 3 (N=5, in the present embodiment). The power supply circuit 53 is in a correspondence relation with the power supply circuits 1 to 3 described in Embodiments 1 to 3 (except for the voltage sources 11_1 to 11_N).

The antennas 51_1 to 51_5 receive radio waves of a predetermined frequency band, and output the received AC signals to the RF-DC conversion circuits 52_1 to 52_5. The antennas 51_1 to 51_5 are configured to be able to receive radio waves of a frequency band (i.e., a high-energy frequency band) that is commonly used in an environment in which a power supply system is placed. For example, the antennas 51_1 to 51_5 are configured to be able to receive radio waves of frequency bands of cellular phones, radio waves of frequency bands of wireless LANs, and radio waves of frequency bands for terrestrial digital broadcasting. The antennas 51_1 to 51_5 may be configured to receive radio waves of a single frequency band or may be configured to receive radio waves of a plurality of frequency bands.

The RF-DC conversion circuits 52_1 to 52_5 are provided so as to correspond to the antennas 51_1 to 51_5, convert the AC signals received by the antennas 51_1 to 51_5 into DC signals, and output these DC signals to the power supply circuit 53.

The power supply circuit 53 generates a power supply voltage using power supplied from the RF-DC conversion circuits 52_1 to 52_5, and supplies the power supply voltage to the load circuit 55. The power supply circuit 53 can be configured using a semiconductor chip 54. Note that the configuration and operations of the power supply circuit 53 are the same as those of the power supply circuits 1 to 3 described in Embodiments 1 to 3; thus, the detailed descriptions thereof are omitted accordingly.

Note that the above has described a case in which the power supply system shown in FIG. 19 has the antennas 51_1 to 51_5 and RF-DC conversion circuits 52_1 to 52_5 as the voltage sources; however, in the present embodiment, the power supply system may have thermoelectric elements or solar cells instead of these components. Thermal energy can be recovered through the use of thermoelectric elements. Moreover, optical energy can be recovered through the use of solar cells.

Figure 20:
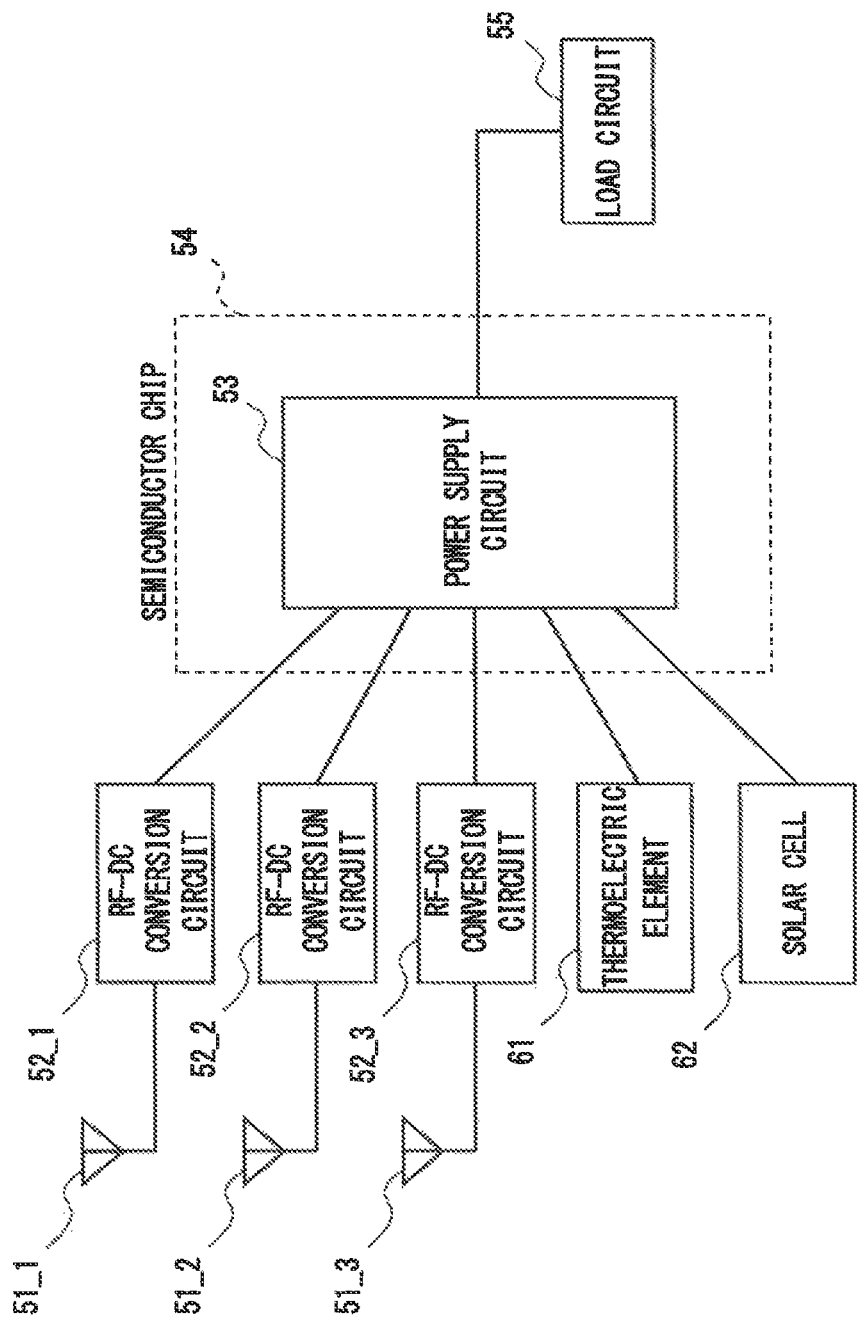
FIG. 20 is a block diagram showing another example of the power supply system according to Embodiment 4.

In addition, as shown in FIG. 20, a combination of a plurality of types of voltage sources may be used as the voltage sources. FIG. 20 shows an example in which a combination of the antennas 51_1 to 51_3, the RF-DC conversion circuits 52_1 to 52_3, a thermoelectric element 61, and a solar cell 62 is used. Thus, even when specific energy (optical energy) of, for example, a dark place cannot be recovered, energy from another input can be recovered by using a combination of a plurality of types of voltage sources.

When a combination of a plurality of types of voltage sources is used, the optimal voltages input to the voltage control circuit 42 (see FIG. 15) vary depending on the balances of the intensities of, for example, radio wave energy, thermal energy, and optical energy. However, in the power supply circuit 3 described in Embodiment 3, even when the plurality of voltage sources of different input voltages are connected, the boosting ratio can be controlled depending on the connected voltage sources. Therefore, the input voltages can efficiently be boosted even when a combination of the plurality of types of voltage sources is used.

Figure 21:
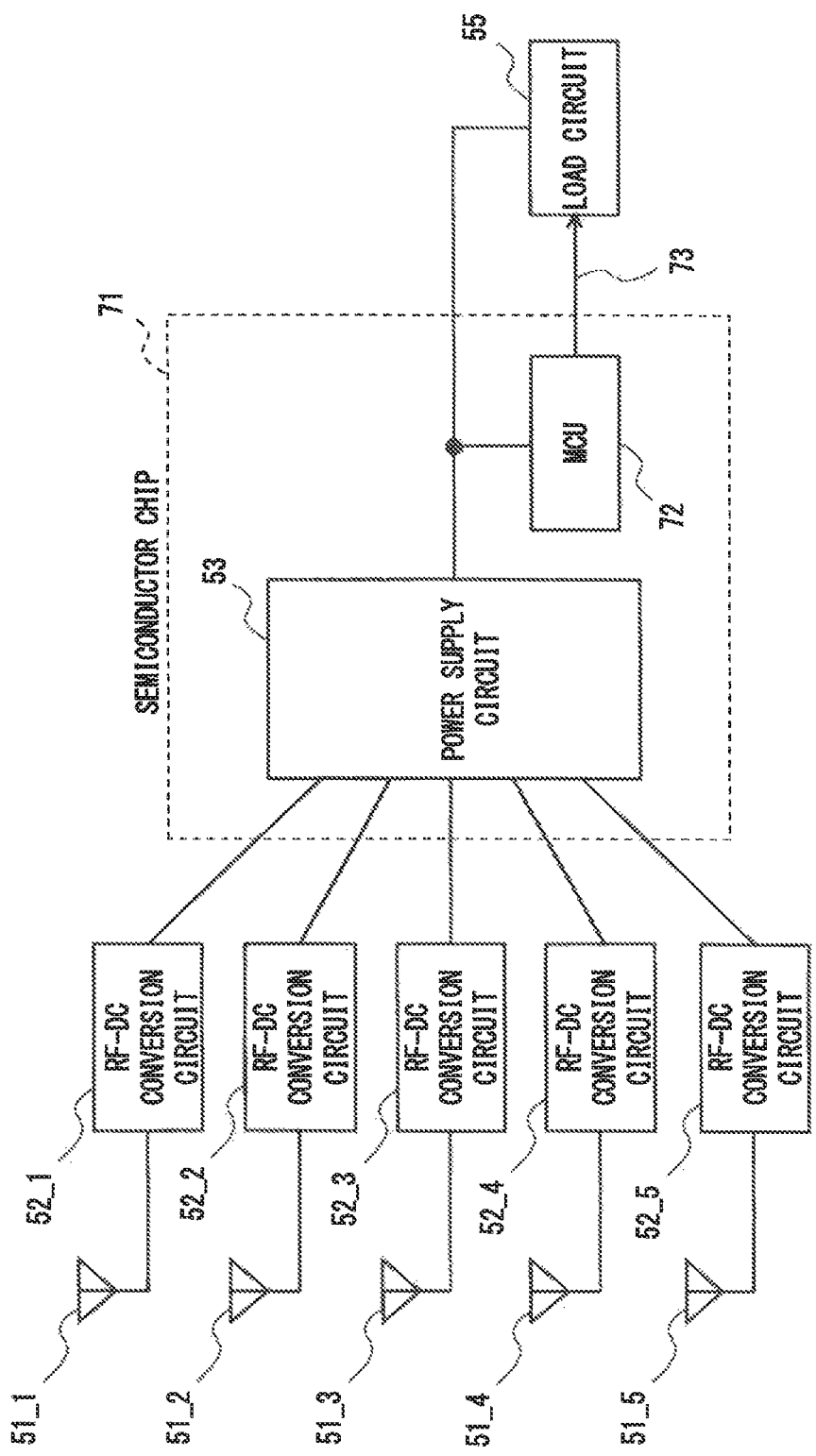
FIG. 21 is a block diagram showing another example of the power supply system according to Embodiment 4.

In the present embodiment, a micro-controller unit (MCU) 72 that is driven by the power supply circuit 53 may be installed in a semiconductor chip 71, and the load circuit 55 may be controlled using a control signal that is output from the MCU 72, as shown in FIG. 21. Such a configuration can control the load circuit 55 in more detail such as stopping the operations of the load circuit 55 when the output voltage of the power supply circuit 53 is low.

Figure 22:
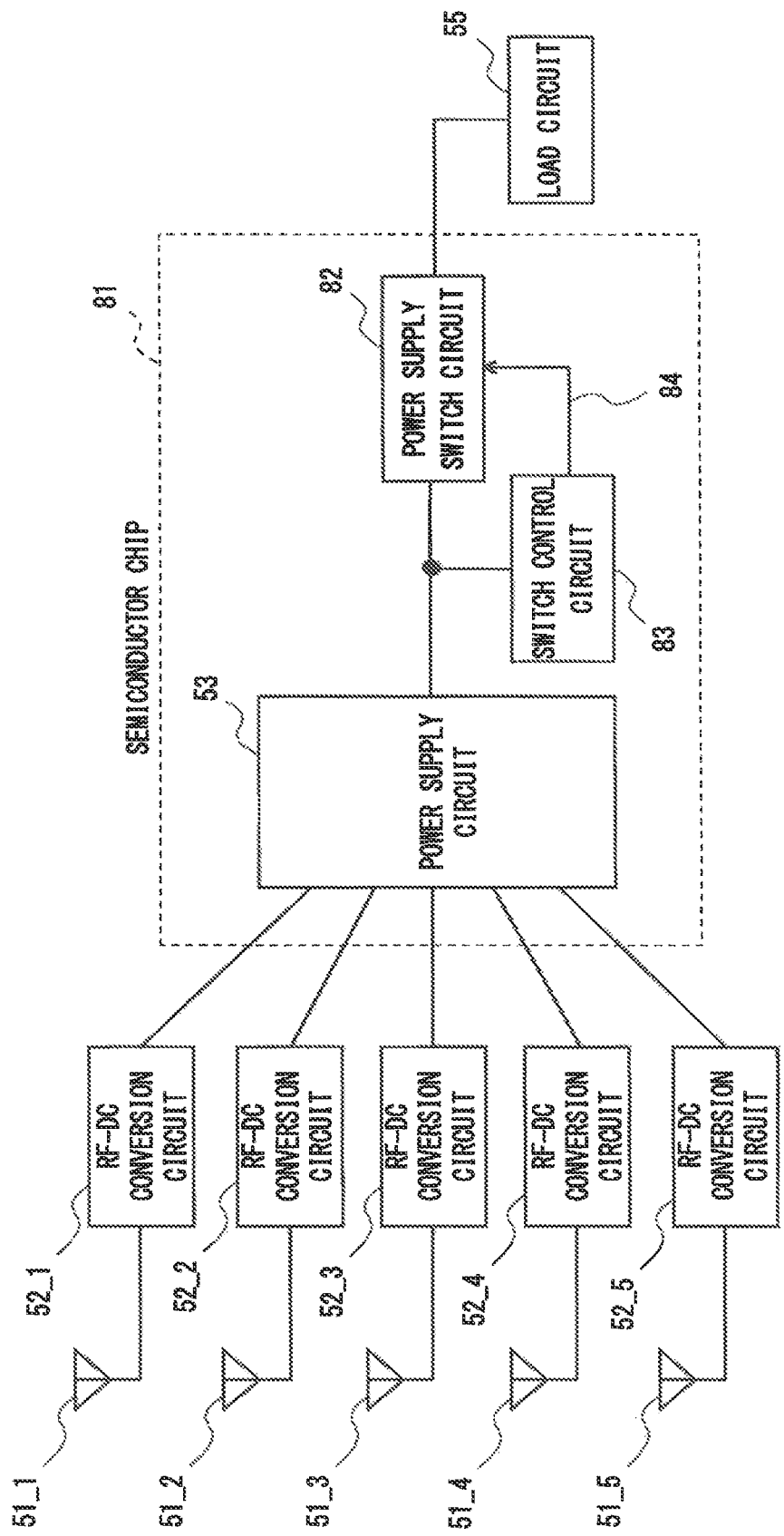
FIG. 22 is a block diagram showing another example of the power supply system according to Embodiment 4.

In the present embodiment, a power supply switch circuit for controlling supply of voltage to the load circuit 55 and a switch control circuit 83 for controlling the power supply switch circuit 82 may be installed in a semiconductor chip 81, as shown in FIG. 22. When the output voltage of the power supply circuit 53 is equal to or greater than a constant voltage (equal to or greater than an operation voltage of the load circuit 55), the switch control circuit 83 outputs a control signal 84 to the power supply switch circuit 82. Upon reception of the control signal 84, the power supply switch circuit 82 connects the power supply circuit 53 and the load circuit 55 to each other so that power is supplied to the load circuit 55.

Such a configuration can not only start supplying a voltage to the load circuit 55 after the output voltage of the power supply circuit 53 becomes equal to or greater than the constant voltage (equal to or greater than the operation voltage of the load circuit 55), but also activate the load circuit 55 stably even when the output voltage is equal to or less than an operation guarantee voltage and the current consumption of the load circuit 55 is high.

The first to fourth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A power supply system, comprising:
   a plurality of voltage sources;
   a switch circuit that switches between a state in which the plurality of voltage sources are connected in series and a state in which the plurality of voltage sources are connected in parallel; and
   a voltage control circuit that boosts an input voltage,
   wherein the switch circuit connects the plurality of voltage sources in series, supplies an output of the plurality of serially connected voltage sources to an output node of the voltage control circuit, thereafter connects the plurality of voltage sources in parallel, and supplies outputs of the plurality of parallel-connected voltage sources to the voltage control circuit, and
   the voltage control circuit boosts voltages of the plurality of parallel-connected voltage sources,
   wherein the plurality of voltage sources comprises:
   a plurality of antennas, and
   a plurality of RF-DC conversion circuits configured to be provided so as to correspond to each of the plurality of antennas and to convert radio frequency signals received by the plurality of antennas into DC signals.

2. The power supply system according to claim 1, wherein the plurality of antennas are configured to receive radio waves of a predetermined frequency band, and
the predetermined frequency band is at least one of frequency bands of cellular phones, frequency bands of wireless LANs, and frequency bands for terrestrial digital broadcasting.

3. The power supply system according to claim 1, wherein the plurality of voltage sources further comprises at least one of a thermoelectric element and a solar cell.

4. The power supply system according to claim 3, wherein the voltage control circuit controls a boosting ratio according to the voltage sources connected to the voltage control circuit.

5. The power supply system according to claim 4, further comprising an input voltage monitor circuit that monitors each of the voltages of the plurality of voltage sources,
wherein the voltage control circuit controls boosting ratios of the voltages of the voltage sources according to monitor results of the input voltage monitor circuit.

6. The power supply system according to claim 5, wherein the voltage control circuit sets a boosting ratio thereof in such a manner that the lower the voltages of the voltage sources are, the higher the boosting ratio becomes.

7. The power supply system according to claim 1, further comprising a semiconductor chip that includes the switch circuit and the voltage control circuit,
wherein the semiconductor chip is connected to the plurality of voltage sources.

8. A power supply system, comprising:
a plurality of voltage sources;
a switch circuit that switches between a state in which the plurality of voltage sources are connected in series and a state in which the plurality of voltage sources are connected in parallel; and
a voltage control circuit that boosts an input voltage,
wherein the switch circuit connects the plurality of voltage sources in series, supplies an output of the plurality of serially connected voltage sources to an output node of the voltage control circuit, thereafter connects the plurality of voltage sources in parallel, and supplies outputs of the plurality of parallel-connected voltage sources to the voltage control circuit, and
the voltage control circuit boosts voltages of the plurality of parallel-connected voltage sources,
wherein a power supply circuit that includes the switch circuit and the voltage control circuit is configured by using a semiconductor chip.

9. The power supply system according to claim 8, further comprising a load circuit, a power supply voltage from the power supply circuit being supplied to the load circuit, wherein
the semiconductor chip further comprises a micro-controller unit,
the micro-controller unit is configured to be driven by the power supply voltage supplied from the power supply circuit and to control the load circuit by using a control signal output from the micro-controller unit.

10. The power supply system according to claim 8, further comprising a load circuit, a power supply voltage from the power supply circuit being supplied to the load circuit, wherein
the semiconductor chip further comprises:
a power supply switch circuit configured to control supply of voltage to the load circuit, and
a switch control circuit configured to control the power supply switch circuit.

11. The power supply system according to claim 10, wherein
when the output voltage of the power supply circuit is equal to or greater than an operation voltage of the load circuit, the switch control circuit controls the power supply switch circuit so that the power supply voltage from the power supply circuit is supplied to the load circuit.

12. The power supply system according to claim 8, wherein at least one of the plurality of voltage sources includes an RF-DC conversion circuit configured to convert radio frequency signals received by an antenna into DC signals.

* * * * *